US012153550B2

(12) United States Patent
Sarkis et al.

(10) Patent No.: US 12,153,550 B2
(45) Date of Patent: Nov. 26, 2024

(54) PREDICTIVE DOCUMENT RECOMMENDATION IN DOCUMENT COLLABORATION SERVER SYSTEMS USING TEMPORALLY CORRELATED DOCUMENT VIEWING SEQUENCE SETS

(71) Applicants: ATLASSIAN PTY LTD., Sydney (AU); ATLASSIAN US, INC., San Francisco, CA (US)

(72) Inventors: Rameil Sarkis, Mountain View, CA (US); Chen Ling, Mountain View, CA (US); Happiness Munedzimwe, Mountain View, CA (US); Jason Phan, Mountain View, CA (US); Connor Lin, Mountain View, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/218,980

(22) Filed: Mar. 31, 2021

(65) Prior Publication Data

US 2022/0318197 A1 Oct. 6, 2022

(51) Int. Cl.
*G06F 16/176* (2019.01)
*G06F 16/93* (2019.01)
*H04L 67/10* (2022.01)
*H04L 67/306* (2022.01)

(52) U.S. Cl.
CPC ........... *G06F 16/176* (2019.01); *G06F 16/93* (2019.01); *H04L 67/10* (2013.01); *H04L 67/306* (2013.01)

(58) Field of Classification Search
CPC ....... G06F 16/176; G06F 16/93; H04L 67/10; H04L 67/306
See application file for complete search history.

(56) References Cited

U.S. PATENT DOCUMENTS

| 9,002,839 | B1* | 4/2015 | Rospo | G06Q 30/0255 707/732 |
| 9,292,505 | B1* | 3/2016 | Cooke | G06F 3/04842 |
| 9,578,374 | B1* | 2/2017 | Whitten | H04N 21/25891 |
| 10,540,404 | B1* | 1/2020 | Dang | G06Q 10/063116 |
| 11,100,182 | B1* | 8/2021 | Paul | G06Q 50/01 |
| 2003/0212760 | A1* | 11/2003 | Chen | H04L 67/564 703/2 |
| 2006/0200435 | A1* | 9/2006 | Flinn | G06N 5/04 706/12 |
| 2007/0094157 | A1* | 4/2007 | Flinn | G06F 8/10 706/2 |
| 2007/0203872 | A1* | 8/2007 | Flinn | G06N 5/048 706/62 |

(Continued)

*Primary Examiner* — David P Zarka
*Assistant Examiner* — Wuji Chen
(74) *Attorney, Agent, or Firm* — Alston & Bird LLP

(57) ABSTRACT

In general, embodiments of the present invention provide methods, apparatuses, systems, computing devices, and/or the like that are configured to enable effective and efficient predictive document recommendation in collaborative document server systems. In one example, a method comprises generating a recommended collaborative document set for a primary collaborative document using a cross-document correlation model that is characterized by a temporally correlated document viewing sequence set and a cross-user correlation model that is characterized by a qualifying user relationship set.

14 Claims, 14 Drawing Sheets

(56) References Cited

U.S. PATENT DOCUMENTS

| | | |
|---|---|---|
| 2008/0208847 A1 | 8/2008 | Moerchen et al. |
| 2008/0288354 A1* | 11/2008 | Flinn .................. G06Q 30/0267 |
| | | 705/14.66 |
| 2009/0083278 A1* | 3/2009 | Zhao ..................... G06F 16/986 |
| 2010/0010986 A1* | 1/2010 | Icho ........................ G06F 16/44 |
| | | 707/E17.014 |
| 2010/0131983 A1* | 5/2010 | Shannon ............. H04N 21/4524 |
| | | 725/46 |
| 2011/0010342 A1* | 1/2011 | Chen ..................... G06F 16/178 |
| | | 707/637 |
| 2011/0184636 A1 | 7/2011 | Rolf et al. |
| 2012/0102403 A1* | 4/2012 | Pennington ......... H04L 12/1827 |
| | | 348/14.03 |
| 2012/0166432 A1 | 6/2012 | Tseng |
| 2012/0310951 A1* | 12/2012 | Kumar .................... G06F 16/93 |
| | | 707/E17.064 |
| 2013/0006974 A1 | 1/2013 | Agrawal et al. |
| 2013/0047176 A1* | 2/2013 | Charania ................. G06F 16/74 |
| | | 725/14 |
| 2013/0166188 A1 | 6/2013 | Zheng et al. |
| 2013/0325856 A1 | 12/2013 | Soto Matamala et al. |
| 2014/0207730 A1 | 7/2014 | Spataro et al. |
| 2014/0236956 A1* | 8/2014 | Matsuura ............. G06F 16/9535 |
| | | 707/740 |
| 2014/0274122 A1 | 9/2014 | Tseng et al. |
| 2014/0280103 A1 | 9/2014 | Harris et al. |
| 2014/0298207 A1 | 10/2014 | Ittah et al. |
| 2015/0019520 A1 | 1/2015 | Shtaygrud et al. |
| 2015/0112963 A1 | 4/2015 | Mojtahedi et al. |
| 2015/0128020 A1 | 5/2015 | Chávez et al. |
| 2015/0149430 A1 | 5/2015 | Flake et al. |
| 2015/0356183 A1 | 12/2015 | Green et al. |
| 2016/0004394 A1* | 1/2016 | Macadaan ............... G06F 16/54 |
| | | 715/747 |
| 2016/0188686 A1* | 6/2016 | Hopkins ............... G06F 16/254 |
| | | 707/602 |
| 2016/0227283 A1* | 8/2016 | Kelly ................ H04N 21/44213 |
| 2017/0169333 A1* | 6/2017 | Chakra ............... G06F 16/9535 |
| 2018/0189693 A1* | 7/2018 | Newhouse ......... G06Q 10/0631 |
| 2019/0129968 A1* | 5/2019 | Neylan ............... G06F 16/1767 |
| 2019/0356963 A1* | 11/2019 | Roe .................. H04N 21/44226 |
| 2020/0028925 A1* | 1/2020 | Monge Nunez .... G06F 16/9035 |
| 2020/0033144 A1* | 1/2020 | Du ..................... G01C 21/3484 |
| 2020/0042606 A1* | 2/2020 | Ben-Ishay ................ G06F 9/541 |
| 2020/0296329 A1* | 9/2020 | Tang ..................... G06F 1/1694 |
| 2021/0234866 A1* | 7/2021 | Michalowitz ...... H04N 21/4542 |
| 2021/0374178 A1* | 12/2021 | Deng .................. G06F 16/24578 |
| 2022/0164534 A1* | 5/2022 | Kalluri, Jr. ............ G06F 3/0482 |

* cited by examiner

800

```
//--- step 1
// load instances/companies

:auto USING PERIODIC COMMIT
LOAD CSV WITH HEADERS FROM 'file:///sampleinstancesOct23.csv' AS row
WITH
    row.tenantid AS tenantid,
    row.userid AS userid,
    row.action AS action,
    row.pageid AS pageid,
    toInteger(row.frequency) AS frequency
MERGE (i:Instance {tenantid: tenantid
    }

RETURN count(i)
```

FIG. 8

```
// --- step 2 ---
// define page nodes

:auto USING PERIODIC COMMIT
LOAD CSV WITH HEADERS FROM 'file:///sampleinstancesOct23.csv' AS row
WITH
    row.tenantid AS tenantid,
    row.userid AS userid,
    row.action AS action,
    row.pageid AS pageid,
    toInteger(row.frequency) AS frequency
MERGE (p:Page {pageid: pageid})
RETURN count(p)
```

FIG. 9

```
// --- step 3 ---
// define user nodes
:auto USING PERIODIC COMMIT
LOAD CSV WITH HEADERS FROM 'file:///sampleinstancesOct23.csv' AS row
WITH
    row.tenantid AS tenantid,
    row.userid AS userid,
    row.action AS action,
    row.pageid AS pageid,
    toInteger(row.frequency) AS frequency
MERGE (u:User {userId: userid})
RETURN count(u)
```

```
// --- step 4 ---
// load viewership relationship
:auto USING PERIODIC COMMIT
LOAD CSV WITH HEADERS FROM 'file:///sampleInstancesOct23.csv' AS row
WITH
    row.tenantid AS tenantid,
    row.userid AS userid,
    row.action AS action,
    row.pageid AS pageid,
    toInteger(row.frequency) AS frequency
MATCH (i:Instance {tenantId: tenantid})
MATCH (p:Page {pageId: pageid})
MATCH (u:User {userId: userid})
MERGE (u)-[r:WORKS_AT]->(i)
MERGE (u)-[a:ACTIONED {action: action}]->(p)
    SET a.frequency = frequency
RETURN *
```

FIG. 11

```
// --- step 5 ---
// link users viewing common pages
MATCH (ua:User)-[a:ACTIONED]->(p:Page)<-[b:ACTIONED]-(ub:User)
WHERE ua.userId<>ub.userId
    AND ua.tenantId = ub.tenantId
WITH sum(a.frequency + b.frequency) AS collab_weight
CREATE (ua:User)-[c:COLLABORATED]->(ub:User)
    SET c.weight = collab_weight
```

PREDICTIVE DOCUMENT RECOMMENDATION IN DOCUMENT COLLABORATION SERVER SYSTEMS USING TEMPORALLY CORRELATED DOCUMENT VIEWING SEQUENCE SETS

BACKGROUND

Various methods, apparatuses, and systems are configured to provide techniques for predictive document recommendation in collaborative document server systems. Applicant has identified many deficiencies and problems associated with existing methods, apparatuses, and systems for predictive document recommendation in collaborative document server systems. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to enable effective and efficient predictive document recommendation in collaborative document server systems. For example, certain embodiments of the present invention provide methods, apparatuses, systems, computing devices, and/or the like that are configured to perform predictive document recommendation in collaborative document server systems using one or more of the following: cross-document relationship models, cross-user relationship models, and user-document relationship sufficiency criteria.

In accordance with one aspect, a computer-implemented method is provided. In one embodiment, a method comprises: determining, using a cross-document correlation model, a co-visited document subset of the collaborative document set, wherein: (i) the cross-document correlation model is characterized by a temporally correlated document viewing sequence set, (ii) each temporally correlated document viewing sequence in the temporally correlated document viewing sequence set is associated with a co-visited user profile of the user profile set, (iii) each collaborative document in the collaborative document set is associated with a co-visited user profile subset of the user profile set that comprises any co-visited user profiles for any temporally correlated document viewing sequences that comprise the collaborative document, and (iv) each collaborative document in the co-visited document subset is associated with at least one temporally correlated document viewing sequence in the temporally correlated document viewing sequence set that comprises the primary collaborative document; determining, using a cross-user correlation model, a user-related document subset of the co-visited document subset, wherein: (i) the cross-user correlation model is characterized by a qualifying user relationship set, and (ii) each co-visited user profile subset for the user-related document subset comprises at least one qualifying co-visited user profile that has a qualifying relationship with the primary user profile in accordance with the user qualifying relationship set; and generating the recommended collaborative document set based on the user-related document subset.

In accordance with another aspect, a computer program product is provided. The computer program product may comprise at least one computer-readable storage medium having computer-readable program code portions stored therein, the computer-readable program code portions comprising executable portions configured to: determine, using a cross-document correlation model, a co-visited document subset of the collaborative document set, wherein: (i) the cross-document correlation model is characterized by a temporally correlated document viewing sequence set, (ii) each temporally correlated document viewing sequence in the temporally correlated document viewing sequence set is associated with a co-visited user profile of the user profile set, (iii) each collaborative document in the collaborative document set is associated with a co-visited user profile subset of the user profile set that comprises any co-visited user profiles for any temporally correlated document viewing sequences that comprise the collaborative document, and (iv) each collaborative document in the co-visited document subset is associated with at least one temporally correlated document viewing sequence in the temporally correlated document viewing sequence set that comprises the primary collaborative document; determine, using a cross-user correlation model, a user-related document subset of the co-visited document subset, wherein: (i) the cross-user correlation model is characterized by a qualifying user relationship set, and (ii) each co-visited user profile subset for the user-related document subset comprises at least one qualifying co-visited user profile that has a qualifying relationship with the primary user profile in accordance with the user qualifying relationship set; and generate the recommended collaborative document set based on the user-related document subset.

In accordance with yet another aspect, an apparatus comprising at least one processor and at least one memory including computer program code is provided. In one embodiment, the at least one memory and the computer program code may be configured to, with the processor, cause the apparatus to: determine, using a cross-document correlation model, a co-visited document subset of the collaborative document set, wherein: (i) the cross-document correlation model is characterized by a temporally correlated document viewing sequence set, (ii) each temporally correlated document viewing sequence in the temporally correlated document viewing sequence set is associated with a co-visited user profile of the user profile set, (iii) each collaborative document in the collaborative document set is associated with a co-visited user profile subset of the user profile set that comprises any co-visited user profiles for any temporally correlated document viewing sequences that comprise the collaborative document, and (iv) each collaborative document in the co-visited document subset is associated with at least one temporally correlated document viewing sequence in the temporally correlated document viewing sequence set that comprises the primary collaborative document; determine, using a cross-user correlation model, a user-related document subset of the co-visited document subset, wherein: (i) the cross-user correlation model is characterized by a qualifying user relationship set, and (ii) each co-visited user profile subset for the user-related document subset comprises at least one qualifying co-visited user profile that has a qualifying relationship with the primary user profile in accordance with the user qualifying relationship set; and generate the recommended collaborative document set based on the user-related document subset.

BRIEF DESCRIPTION OF THE SEVERAL VIEW OF THE DRAWINGS

Having thus described some embodiments in general terms, references will now be made to the accompanying drawings, which are not drawn to scale, and wherein:

FIG. 8 provides an operational example of a code segment for determining a collaborative document set and a user profile set in accordance with at least some embodiments of the present invention.

FIG. 9 provides an operational example of a code segment for determining document nodes for a user-document relationship graph in accordance with at least some embodiments of the present invention.

Figure 10:

FIG. 10 provides an operational example of a code segment for determining user nodes for a user-document relationship graph in accordance with at least some embodiments of the present invention.

FIG. 11 provides an operational example of a code segment for determining user-document relationship edges for a user-document relationship graph in accordance with at least some embodiments of the present invention.

Figure 12:

FIG. 12 provides an operational example of a code segment for determining cross-user relationship edges for a user-document relationship graph in accordance with at least some embodiments of the present invention.

Figure 13:
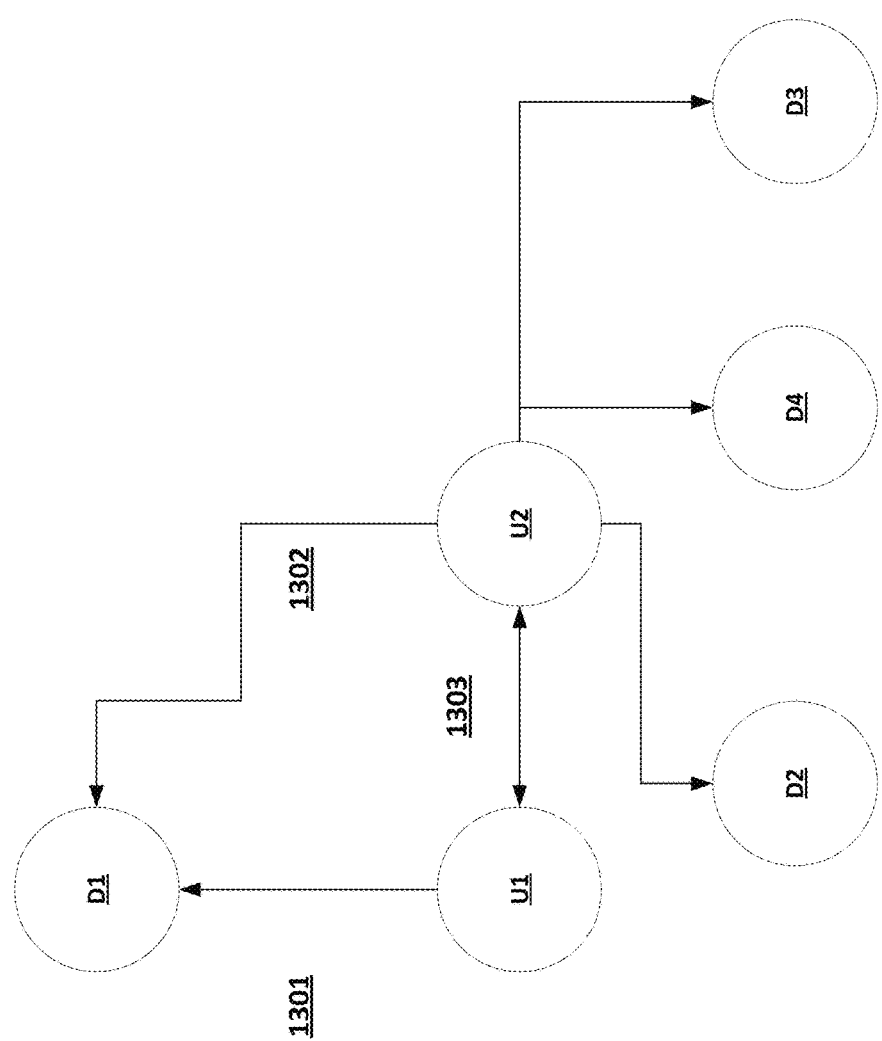

FIG. 13 provides an operational example of a user-document relationship graph in accordance with at least some embodiments of the present invention.

Figure 14:
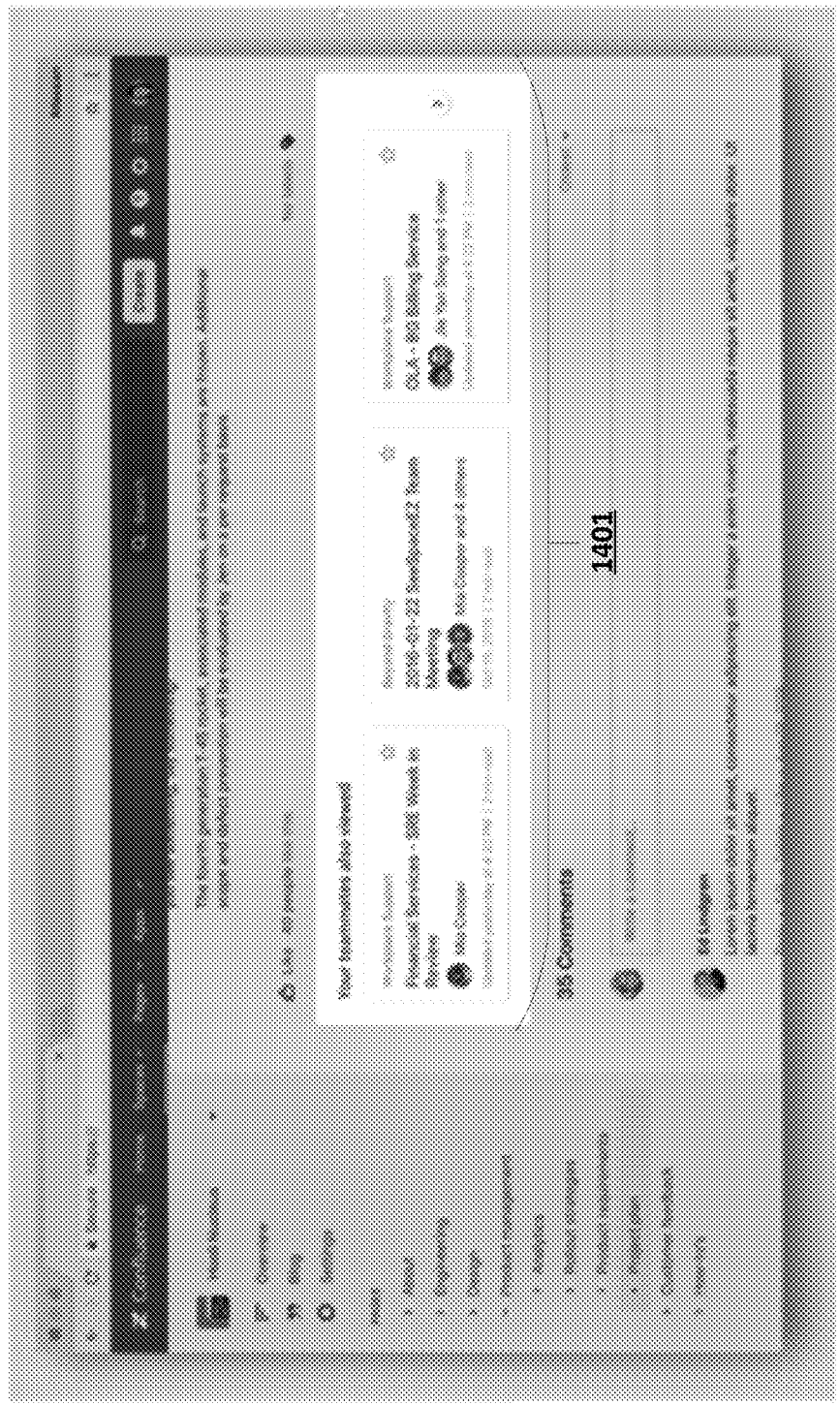

FIG. 14 provides an operational example of a collaborative document user interface with a document recommendation user interface element in accordance with at least some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention address technical problems associated with efficiently and reliably retrieving collaborative documents from a document collaborative server system in an efficient manner that reduces computational load and query latency. The disclosed techniques can be utilized by a document collaboration server system to enable providing document recommendations that can in turn reduce document search queries and/or document transition queries generated by the user profiles of the document collaboration server system, thus reducing the overall computational load on the document collaboration server system. An example of a document collaboration server system that may use the efficiency-enhancing techniques disclosed herein is the Confluence® collaborative document management platform that is owned by Atlassian PTY LTD.

Document collaboration server systems often store a large number of collaborative documents that may be accessible/editable by two or more user profiles. Each collaborative document may at each time be accessed by a group of user profiles that is larger than the group of user profiles that created the documents, and different portions of collaborative documents may be created by different user profiles. Moreover, various collaborative documents created by different groups of user profiles may contain links/references to each other and may enable user profiles to transition from one collaborative document to another collaborative document by selecting the noted links/references. A consequence of this complexity in cross-document relationships enabled by a document collaboration server system is the large number of document search queries and/or document access queries generated by often non-author user profiles in order to explore the large number of interconnected collaborative documents available to them, which in turn imposes a large computational burden on the processing capabilities and network capabilities of the document collaboration server system.

To address the above-noted challenges associated with the numerosity of document search queries and document access queries in complex document relationship environments enabled by document collaboration server systems, various embodiments of the present invention provide end-users with reliable document recommendations. In some embodiments, given a primary user profile that is viewing/accessing a primary collaborative document, a document collaboration server system uses all of the following to generate reliable document recommendations for the primary user profile in relation to the primary collaborative document: cross-document predictive inferences determined based on temporally correlated document sequences, cross-user predictive inferences based on qualifying user relationships, and predictive inferences determined based on evaluating user-document relationships in accordance with user-document relationship sufficiency criteria.

For example, in some embodiments, to generate a recommended collaborative document set for a primary collaborative document of a collaborative document set in relation to a primary user profile of a user profile set, a document collaboration server system first determines, using a cross-document correlation model, a co-visited document subset of the collaborative document set. The cross-document correlation model is characterized by a temporally correlated document viewing sequence set, each temporally correlated document viewing sequence in the temporally correlated document viewing sequence set is associated with a co-visited user profile of the user profile set, each collaborative document in the collaborative document set is associated with a co-visited user profile subset of the user profile set that comprises any co-visited user profiles for any temporally correlated document viewing sequences that comprise the collaborative document, and each collaborative document in the co-visited document subset is associated with at least one temporally correlated document viewing sequence in the temporally correlated document viewing sequence set that comprises the primary collaborative document. Afterward, the document collaboration server system determines, using a cross-user correlation model, a user-related document subset of the co-visited document subset, where the cross-user correlation model is characterized by a qualifying user relationship set, and each co-visited user profile subset for the user-related document subset comprises at least one qualifying co-visited user profile that has a qualifying relationship with the primary user profile in accordance with the user qualifying relationship set. Finally, the document collaboration server system generates the recommended collaborative document set based on a selected subset of the user-related document set, where each collaborative document in the selected subset has a user-document relationship with the at least one qualifying co-visited user profile for the for the collaborative document that satisfies a set of one or more user-document relationship sufficiency criteria.

Using the above three-layered recommendation approach, various embodiments of the present invention enable generating reliable document recommendations that prevent or reduce a scenario where an end-user may end up generating various document search queries to detect related documents and generating document transition queries to explore the search results. In doing so, various embodiments of the present invention can in turn reduce document search queries and/or document transition queries generated by the user profiles of a document collaboration server system, thus reducing the overall computational load on the document collaboration server system.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client computing device" refers to a combination of computer hardware and/or software that is configured to access a service made available by a server. The server is often (but not always) on another computer system, in which case the client accesses the service by way of a network. Client computing devices may include, without limitation, smart phones, tablet computers, laptop computers, wearables, personal computers, enterprise computers, and the like.

The term "server computing device" refers to a combination of computer hardware and/or software that is configured to provide a service to a client device. An example of a server computing device is the document collaboration server computing device 106 of FIG. 1. In some embodiments, a server computing device communicates with one or more client computing devices using one or more computer networks.

The term "collaborative document" refers to a data construct that describes contents of a text-based format file (e.g., a Rich Text Format (RTF) file), where the contents of the text-based format file are configured to be editable/accessible by two or more user profiles. The collaborative document is stored in a storage subsystem of a document collaboration server system that comprises the document collaboration server computing device. For example, the document collaboration server system may enable a first user profile to share a collaborative document with one or more other user profiles, where each of the one or more user profiles may be given defined read/write access privileges. An example of a collaborative document is a Confluence® page.

The term "recommended collaborative document set" refers to a data construct that is generated by a document collaboration server computing device and transmitted to a client computing device, where the client computing device is configured to generate one or more user interface elements based on the recommended collaborative document set and provide the user interface elements as part of a user interface being displayed to an end user of the client computing device. The recommended collaborative document set comprises a subset of a collaborative document set (i.e., a set of one or more collaborative documents, as defined above), where each collaborative document in the subset is determined to be related to a corresponding primary collaborative document associated with the recommended collaborative document set and a corresponding primary user profile associated with the recommended collaborative document set. For example, consider an exemplary context where the primary user profile is viewing/accessing a collaborative document user interface associated with the primary collaborative document. In this context, the document collaboration server computing device may be configured to: (i) generate the recommended collaborative document set for the primary collaborative document and the primary user profile, and (ii) provide the recommended collaborative document set to a client computing device that is enabling the primary user profile to view/access the primary collaborative document. Moreover, in the described exemplary context, the client computing device may be configured to: (i) generate a document recommendation user interface element that describes each collaborative document in the recommended collaborative document set, and (ii) provide the document recommendation user interface element as part of the document collaboration user interface. As further described below, in some embodiments, the recommended collaborative document set may also define an ordering of the collaborative documents in the recommended collaborative document set based on a document recommendation score for each collaborative document in the recommended collaborative document set.

The term "cross-document correlation model" refers to a data construct that is generated by a document collaboration server computing device and maintained in a storage subsystem of a document collaboration server system that comprises the document collaboration server computing device. The cross-document correlation model is characterized by a temporally correlated document viewing sequence set (i.e., a set of one or more temporally correlated document viewing sequences), where the document collaboration server computing device utilizes the temporally correlated document viewing sequence set to determine a co-visited document subset for a primary collaborative document. For example, given a primary collaborative document, the document collaboration server computing device may be configured to utilize the temporally correlated document viewing sequence set to identify any collaborative documents that are part of a temporally correlated document viewing sequence that comprises the primary collaborative document. For example, consider the following temporally correlated document viewing sequence sets: $S_1=\{D_1, D_4, D_{10}, D_{11}\}$, $S_2=\{D_{11}, D_1, D_{13}, D_{15}, D_{32}, D_{61}, D_{17}\}$, $S_3=\{D_{21}, D4_{22}, D_{33}, D_{71}\}$, and $S_4=\{D_{45}, D_{41}, D_{51}, D_{33}, D_{54}, D_{66}, D_{68}, D_{69}, D_{131}\}$. Given the primary collaborative document $D_1$, then the co-visited document subset for $D_1$ comprises: $D_4$ (which is part of the temporally correlated document viewing sequence $S_1$ that includes $D_1$), $D_{10}$ (which is part of the temporally correlated document viewing sequence $S_1$ that includes $D_1$), $D_{11}$ (which is part of the temporally correlated document viewing sequences $S_1$ and $S_2$ that both include $D_1$), $D_{13}$ (which is part of the temporally correlated document viewing sequence $S_2$ that includes $D_1$), $D_{15}$ (which is part of the temporally correlated document viewing sequence $S_2$ that includes $D_1$), $D_{17}$ (which is part of the temporally correlated document viewing sequence $S_2$ that includes $D_1$), $D_{32}$ (which is part of the temporally correlated document viewing sequence $S_4$ that includes $D_1$), $D_{32}$ (which is part of the temporally correlated document viewing sequence $S_2$ that includes $D_1$), $D_{33}$ (which is part of the temporally correlated document viewing sequence $S_4$ that includes $D_1$), $D_{54}$ (which is part of the temporally correlated document viewing sequence $S_4$ that includes $D_1$), $D_{61}$ (which is part of the temporally correlated document viewing sequence $S_2$ that includes $D_1$), $D_{66}$ (which is part of the temporally correlated document viewing sequence $S_4$ that includes $D_1$), $D_{68}$ (which is part of the temporally correlated document viewing sequence $S_4$ that includes $D_1$), $D_{69}$ (which is part of the temporally correlated document viewing sequence $S_4$ that includes $D_1$), and $D_{131}$ (which is part of the temporally correlated document viewing sequence $S_4$ that includes $D_1$).

The term "temporally correlated document viewing sequence" refers to a data construct that is generated by a document collaboration server computing device based on document viewing data by a client computing device that is associated with a user profile. Temporally correlated document viewing sequences are stored in a storage subsystem of a document collaboration server system that comprises the document collaboration server computing device as part of a cross-document correlation model. The temporally correlated document viewing sequence describes a sequence of collaborative documents, where the ordered sequence describes a set of collaborative documents that are viewed by a common user profile during a common document viewing session. For example, a temporally correlated document viewing sequence may describe a set of collaborative documents that are viewed by a common user profile during a defined time window having a defined time window size (e.g., during a defined 24-hour time window). As another example, a temporally correlated document viewing sequence may describe a set of collaborative documents that are viewed by a common user profile during a dynamically inferred time period that begins upon a defined session initiation action by the common user profile (e.g., logging into a document viewing platform associated with the document collaboration server system that comprises the document collaboration server computing device) and terminates upon a defined session termination action by the common user profile (e.g., logging out of a document viewing platform associated with the document collaboration server system that comprises the document collaboration server computing device). In some embodiments, the temporally correlated document viewing sequence describes an ordered sequence of collaborative documents, where the position of each collaborative document in the ordered sequence is determined based on a viewing sequence of the collaborative documents by the common user profile during the common document viewing session.

The term "co-visited document subset" refers to a data construct that is generated by a document collaboration server computing device and used by the document collaboration server computing device to generate a recommended collaborative document set, where the recommended collaborative document set is configured to be transmitted to a client computing device and used by the client computing device to generate one or more user interface elements based on the recommended collaborative document set and provide the user interface elements as part of a user interface being displayed to an end user of the client computing device. The co-visited document subset includes each collaborative document that is in a temporally correlated document viewing sequence that also comprises a primary collaborative document associated with the co-visited document subset. For example, as described above, given the following temporally correlated document viewing sequence sets: $S_1=\{D_1, D_4, D_{10}, D_{11}\}$, $S_2=\{D_{11}, D_1, D_{13}, D_{15}, D_{32}, D_{61}, D_{17}\}$, $S_3=\{D_{21}, D4_{22}, D_{33}, D_{71}\}$, and $S_4=\{D_{45}, D_{41}, D_{51}, D_{33}, D_{54}, D_{66}, D_{68}, D_{69}, D_{131}\}$, and given the primary collaborative document $D_1$, then the co-visited document subset for $D_1$ comprises: $D_4$ (which is part of the temporally correlated document viewing sequence $S_1$ that includes $D_1$), $D_{10}$ (which is part of the temporally correlated document viewing sequence $S_1$ that includes $D_1$), $D_{11}$ (which is part of the temporally correlated document viewing sequences $S_1$ and $S_2$ that both include $D_1$), $D_{13}$ (which is part of the temporally correlated document viewing sequence $S_2$ that includes $D_1$), $D_{15}$ (which is part of the temporally correlated document viewing sequence $S_2$ that includes $D_1$), $D_{17}$ (which is part of the temporally correlated document viewing sequence $S_2$ that includes $D_1$), $D_{32}$ (which is part of the temporally correlated document viewing sequence $S_4$ that includes $D_1$), $D_{32}$ (which is part of the temporally correlated document viewing sequence $S_2$ that includes $D_1$), $D_{33}$ (which is part of the temporally correlated document viewing sequence $S_4$ that includes $D_1$), $D_{54}$ (which is part of the temporally correlated document viewing sequence $S_4$ that includes $D_1$), $D_{61}$ (which is part of the temporally correlated document viewing sequence $S_2$ that includes $D_1$), $D_{66}$ (which is part of the temporally correlated document viewing sequence $S_4$ that includes $D_1$), $D_{68}$ (which is part of the temporally correlated document viewing sequence $S_4$ that includes $D_1$), $D_{69}$ (which is part of the temporally correlated document viewing sequence $S_4$ that includes $D_1$), and $D_{131}$ (which is part of the temporally correlated document viewing sequence $S_4$ that includes $D_1$).

The term "co-visited user profile" refers to a data construct that is generated by a document collaboration server computing device based on document viewing data by a client computing device that is associated with a user profile. Co-visited user profiles are stored in a storage subsystem of a document collaboration server system that comprises the document collaboration server computing device as part of a cross-document correlation model. The co-visited user profile for a temporally correlated document viewing sequence describes the common user profile that has viewed the temporally correlated document viewing sequence in a common document viewing session. For example, if the temporally correlated document viewing sequence $S_4=\{D_{45}, D_{41}, D_{51}, D_{33}, D_{54}, D_{66}, D_{68}, D_{69}, D_{131}\}$ describes that the collaborative documents in the sequence $\{D_{45}, D_{41}, D_{51}, D_{33}, D_{54}, D_{66}, D_{68}, D_{69}, D_{131}\}$ are visited by a common user profile $U_4$ during a common document viewing session, then the co-visited user profile for $S_4$ is $U_4$.

The term "co-visited user profile subset" refers to a data construct that is generated by a document collaboration server computing device based on a cross-document correlation model maintained in a storage subsystem of a document collaboration server system that comprises the document collaboration server computing device. The co-visited user profile subset describes each co-visited user profile for a temporally correlated document viewing sequence in the cross-document collaboration model that includes a collaborative document that is associated with the co-visited user profile. In this way, the co-visited user profile subset describes all user profiles that have visited/accessed the corresponding collaborative document during at least one document viewing session. For example, given a cross-document correlation model characterized by the temporally correlated document viewing sequence sets $S_1=\{D_1, D_4, D_{10}, D_{11}\}$, $S_2=\{D_{11}, D_1, D_{13}, D_{15}, D_{32}, D_{61}, D_{17}\}$, $S_3=\{D_{21}, D4_{22}, D_{33}, D_{71}\}$, and $S_4=\{D_{45}, D_{41}, D_{51}, D_{33}, D_{54}, D_{66}, D_{68}, D_{69}, D_{131}\}$, and further given that the co-visited user profile for $S_1$ is $U_1$, the co-visited user profile for $S_2$ is $U_2$, the co-visited user profile for $S_3$ is $U_3$, and the co-visited user profile for $S_4$ is $U_4$, then (for example) the co-visited user profile subset for $D_4$ includes only $U_1$ (since $D_4$ is only in $S_1$ that is associated with $U_1$), the co-visited use profile subset for $D_{11}$ is $U_1$ and $U_2$ (since $D_{11}$ is both in $S_1$ that is associated with $U_1$ and in $S_2$ that is associated with $U_2$), and the co-visited user profile subset for $D_1$ is $U_1$, $U_2$, and $U_4$ (since $D_1$ is in all of $S_1$ that is associated with $U_1$, $S_2$ that is associated with $U_2$, and $S_4$ that is associated with $U_4$).

The term "cross-user correlation model" refers to a data construct that is generated by a document collaboration server computing device and maintained in a storage subsystem of a document collaboration server system that comprises the document collaboration server computing device. The cross-user correlation model is characterized by a qualifying user relationship set (i.e., a set of one or more qualifying user relationships), where the document collaboration server computing device utilizes the temporally correlated document viewing sequence set to determine a user-related document subset for a primary collaborative document. For example, the document collaboration server computing device may determine that each collaborative document in a defined collaborative document set (e.g., in a co-visited document subset for a given primary collaborative document) whose corresponding co-visited user profile subset has at least one qualifying co-visited user profile that has a qualifying user relationship with a given primary user profile in accordance with the user qualifying relationship set is in the user-related document subset for the primary collaborative document. For example, given a defined collaborative document set that includes a collaborative document $D_2$ that is associated with a user profile $U_2$, a collaborative document $D_3$ that is associated with a user profile $U_3$, and a collaborative document $D_4$ that is associated with a user profile $U_4$, and given a primary user profile $U_1$, if the qualifying user relationship set describes that $U_1$ has a qualifying user relationship with $U_2$ and $U_4$ but not with $U_3$, then the user-related document subset associated with $U_1$ includes $D_2$ and $D_4$ but not $D_3$.

The term "qualifying user relationship" refers to a data construct that is generated by a document collaboration server computing device and maintained in a storage subsystem of a document collaboration server system that comprises the document collaboration server computing device as part of a cross-document user correlation model. The qualifying user relationship describes that two or more user profiles associated with the qualifying user relationship have a user relationship between them that satisfies one or more defined user relationship sufficiency criteria, where the defined user relationship sufficiency criteria may include one or more criteria defined based on whether the two or more user profiles have performed common document collaboration actions with respect to collaborative documents associated with the two or more user profile. For example, in some embodiments, if user profile $U_1$ has commented on a collaborative document associated with the user profile $U_2$ and the user profile $U_2$ has commented on a collaborative document associated with the user profile $U_1$, then the two user profile $U_1$ and $U_2$ are deemed to be associated with a common qualifying user relationship. As another example, in some embodiments, if user profile $U_1$ has shared a collaborative document associated with the user profile $U_2$ and the user profile $U_2$ has shared a collaborative document associated with the user profile $U_1$, then the two user profile $U_1$ and $U_2$ are deemed to be associated with a common qualifying user relationship. As yet another example, in some embodiments, if user profile $U_1$ has performed at least one qualifying document collaboration (e.g., commenting, sharing, starring, editing, liking, and/or the like) with respect to a collaborative document associated with the user profile $U_2$ and the user profile $U_2$ has also performed at least one qualifying document collaboration action (e.g., commenting, sharing, starring, editing, liking, and/or the like) with respect to a collaborative document associated with the user profile $U_1$, then the two user profile $U_1$ and $U_2$ are deemed to be associated with a common qualifying user relationship. As a further example, in some embodiments, if user profile $U_1$ has performed at least n qualifying document collaboration actions (e.g., commenting, sharing, starring, editing, liking, and/or the like) with respect to a collaborative document associated with the user profile $U_2$ and the user profile $U_2$ has also performed at least n qualifying document collaboration actions (e.g., commenting, sharing, starring, editing, liking, and/or the like) with respect to a collaborative document associated with the user profile $U_1$, then the two user profile $U_1$ and $U_2$ are deemed to be associated with a common qualifying user relationship. In some embodiments, the defined user relationship sufficiency criteria may include one or more criteria defined based on whether the two or more user profiles have performed common document collaboration actions with respect to a document collaborative document. In some embodiments, the defined user relationship sufficiency criteria may include one or more criteria defined based on whether the two or more user profiles have performed at least one document collaboration action with respect to a document collaborative document. In some embodiments, the defined user relationship sufficiency criteria may include one or more criteria defined based on whether the two or more user profiles have performed at least n document collaboration actions with respect to a document collaborative document.

The term "qualifying user profile" refers to a data construct that is generated by a document collaboration server computing device and used by the document collaboration server computing device to generate a recommended collaborative document set, where the recommended collaborative document set is configured to be transmitted to a client computing device and used by the client computing device to generate one or more user interface elements based on the recommended collaborative document set and provide the user interface elements as part of a user interface being displayed to an end user of the client computing device. The qualifying user profile describes any user profiles that are deemed to have at least one qualifying relationship with a primary user profile based on a qualifying user relationship set defined by a cross-user correlation model. For example, if the qualifying user relationship set describes that the primary user profile $U_1$ has a qualifying user relationship with the user profile $U_2$ and the user profile $U_4$ but not with the user profile $U_3$, then $U_2$ and $U_4$ are qualifying user profiles, while $U_3$ is not. In some embodiments, a user profile is always deemed to have a qualifying user relationship with itself, such that a user profile is always deemed to be a qualifying user profile with respect to itself.

The term "user-related document subset" refers to a data construct that is generated by a document collaboration server computing device and used by the document collaboration server computing device to generate a recommended collaborative document set, where the recommended collaborative document set is configured to be transmitted to a client computing device and used by the client computing device to generate one or more user interface elements based on the recommended collaborative document set and provide the user interface elements as part of a user interface being displayed to an end user of the client computing device. The user-related document subset for a given user profile may include each collaborative document in a defined collaborative document set (e.g., in a co-visited document subset for a given primary collaborative document) whose corresponding co-visited user profile subset has at least one qualifying co-visited user profile that has a qualifying user relationship with the given primary user profile, as determined in accordance with the user qualifying relationship set. For example, as described above, given a defined collaborative document set that includes a collaborative document $D_2$ that is associated with a user profile $U_2$, a collaborative document $D_3$ that is associated with a user profile $U_3$, and a collaborative document $D_4$ that is associated with a user profile $U_4$, and given a primary user profile $U_1$, if the qualifying user relationship set describes that $U_1$ has a qualifying user relationship with $U_2$ and $U_4$ but not with $U_3$, then the user-related document subset associated with $U_1$ includes $D_2$ and $D_4$ but not $D_3$.

The term "user-document relationship" refers to a data construct that is generated by a document collaboration server computing device based on document viewing data by a client computing device that is associated with a user profile. User-document relationships are stored in a storage subsystem of a document collaboration server system that comprises the document collaboration server computing device as part of a cross-document correlation model. The user-document relationship describes one or more features associated with a documented/recorded interaction of a corresponding user profile with a corresponding collaborative document. For example, the user-document relationship may describe at least one of: (i) how long the corresponding user profile stayed on a collaborative document user interface associated with the corresponding collaborative document during the documented/recorded interaction, and (ii) during the documented/recorded interaction, which one or more of a defined set of document collaboration operations (e.g., editing, commenting, starring, liking, watching, sharing, and/or the like) the corresponding user profile performed in relation to the corresponding collaborative document. In some embodiments, the document collaboration server computing device determines whether a user-document relationship associated with a corresponding user profile and a corresponding collaborative document satisfies one or more defined user-document relationship sufficiency criteria. In some embodiments, the document collaboration server computing device utilizes the noted determination to generate a recommended collaborative document set, where the recommended collaborative document set is configured to be transmitted to a client computing device and used by the client computing device to generate one or more user interface elements based on the recommended collaborative document set and provide the user interface elements as part of a user interface being displayed to an end user of the client computing device. Examples of defined user-document relationship sufficiency criteria include a of defined user-document relationship sufficiency criterion that evaluates whether a user profile has either stayed on a collaborative document user interface associated with the a collaborative document for at least a threshold time period (e.g., for at least forty seconds), or commented on the collaborative document, or starred a collaborative document, or shared a collaborative document, or edited a collaborative document. Other examples of defined user-document relationship sufficiency criteria include a of defined user-document relationship sufficiency criterion that evaluates whether at least n of the following conditions are successfully satisfied: a user profile has stayed on a collaborative document user interface associated with the a collaborative document for at least a threshold time period (e.g., for at least forty seconds), or commented on the collaborative document, or starred a collaborative document, or shared a collaborative document, or edited a collaborative document.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
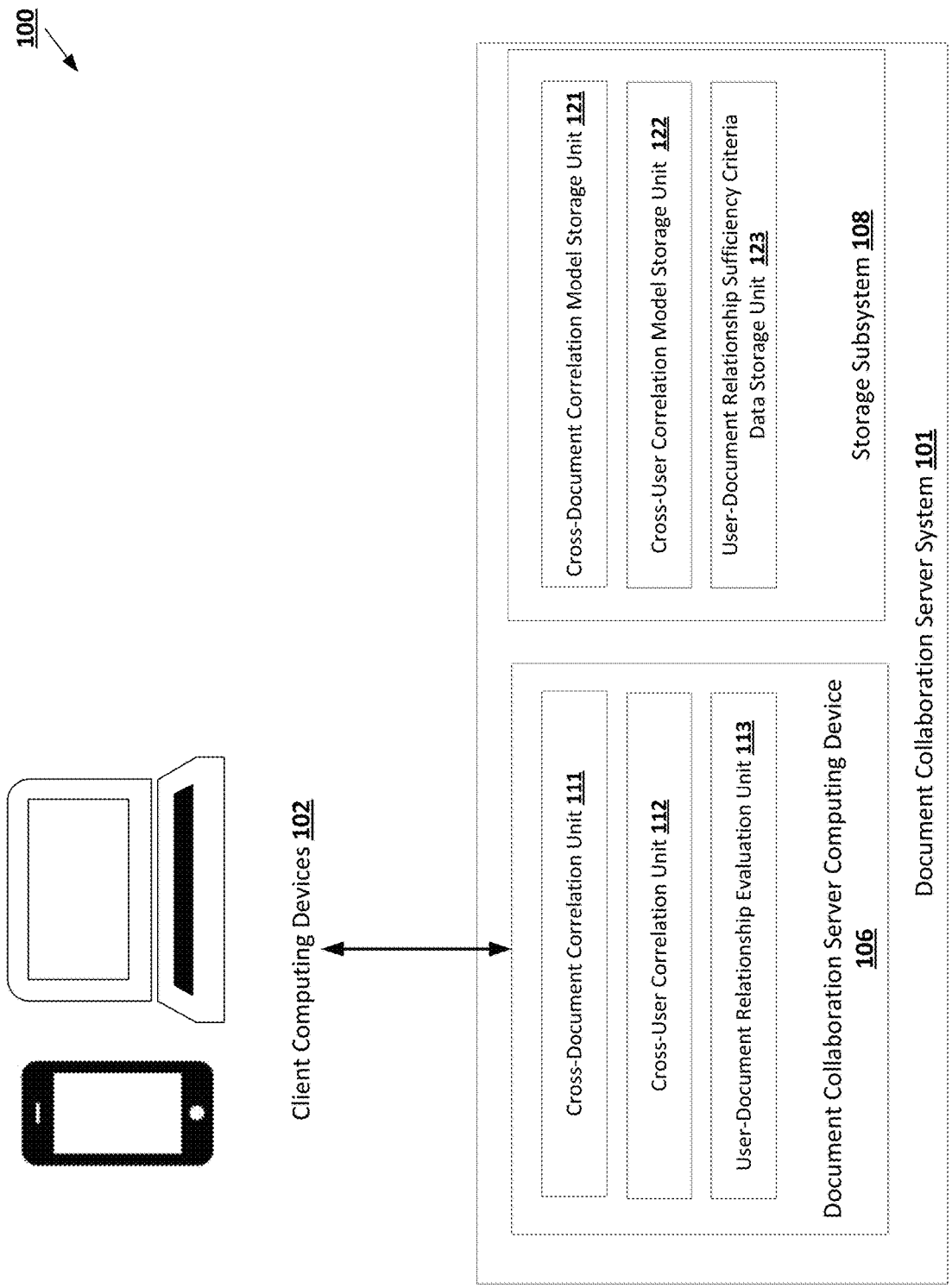
FIG. 1 is a block diagram of an example document collaboration server system architecture within which at least some embodiments of the present invention may operate.

FIG. 1 depicts an exemplary architecture 100 for dynamically updating a document collaboration graph-based interface. The architecture 100 includes one or more client computing devices 102 and a document collaboration server system 101. The document collaboration server system 101 is configured to store collaborative documents in a storage subsystem 108, provide the collaborative documents in response to user queries transmitted by the client computing devices 102, generate dynamically updatable document collaboration graph-based interfaces using the document collaboration server computing device 106, and provide dynamically updatable document collaboration graph-based interfaces to client computing devices 102 in response to user requests for the noted dynamically updatable document collaboration graph-based interfaces as transmitted by the client computing devices 102.

The storage subsystem 108 of the document collaboration server system 101 is configured to store document content data in a document storage unit 121 and collaborative document user transition data in a transition data storage unit 122. The document collaboration server computing device 106 of the document collaboration server system 101 includes a transition modeling unit 111 that is configured to generate document collaboration graph-based interface objects and a dynamic update unit 112 that is configured to generate edge-wise visual effect objects for the document collaboration graph-based interface objects.

The client computing devices 102 and the document collaboration server computing device 106 may communicate over one or more networks. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a Websocket channel. In some embodiments, the protocol is JSON over RPC, JSON over REST/HTTP, and the like.

Exemplary Document Collaboration Server Computing Device

Figure 2:
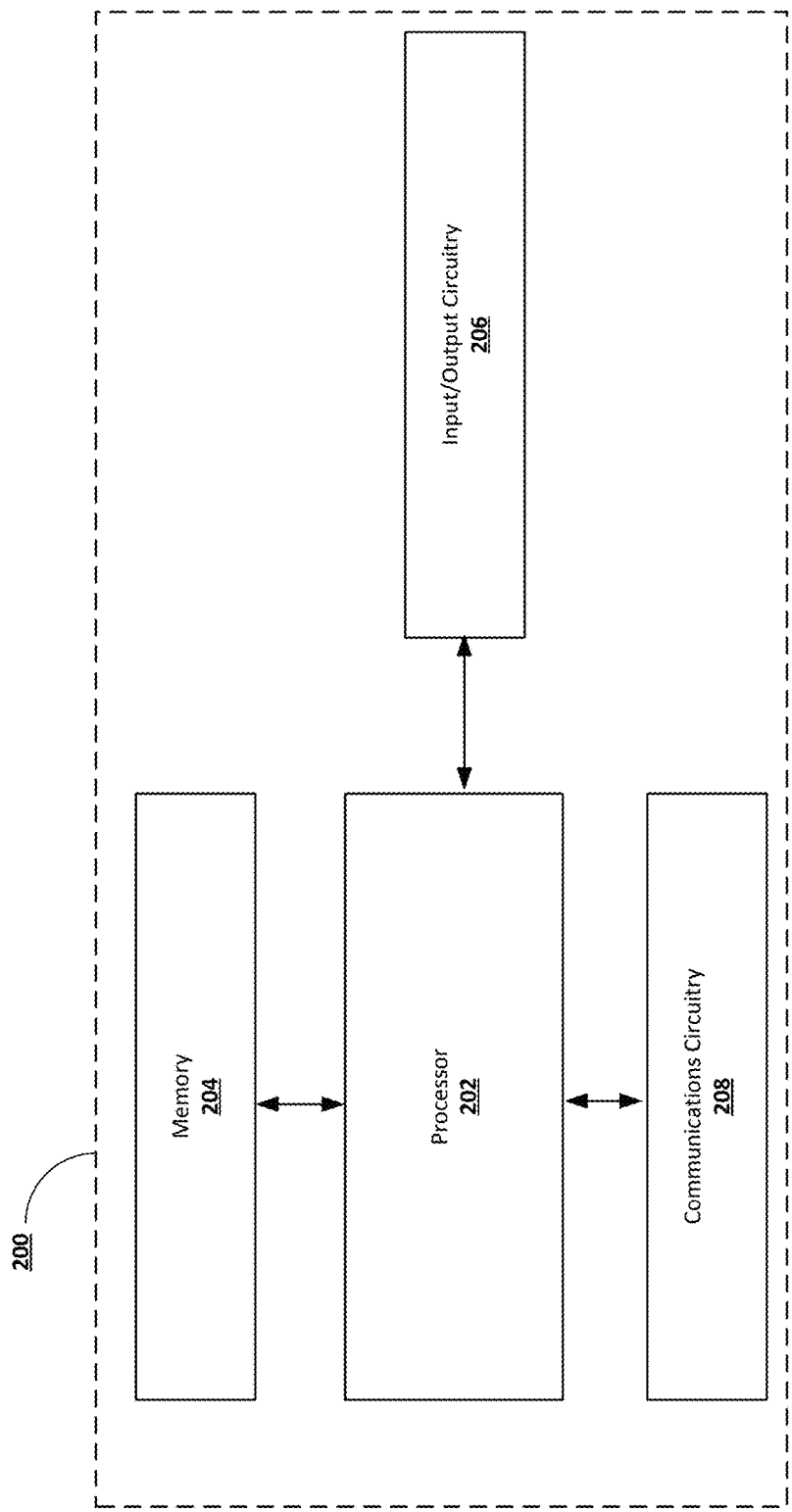
FIG. 2 is a block diagram of an example document collaboration server computing device structured in accordance with at least some embodiments of the present invention.

The document collaboration server computing device 106 may be embodied by one or more computing systems, such as apparatus 200 shown in FIG. 2. The apparatus 200 may include processor 202, memory 204, input/output circuitry 206, and communications circuitry 208. The apparatus 200 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
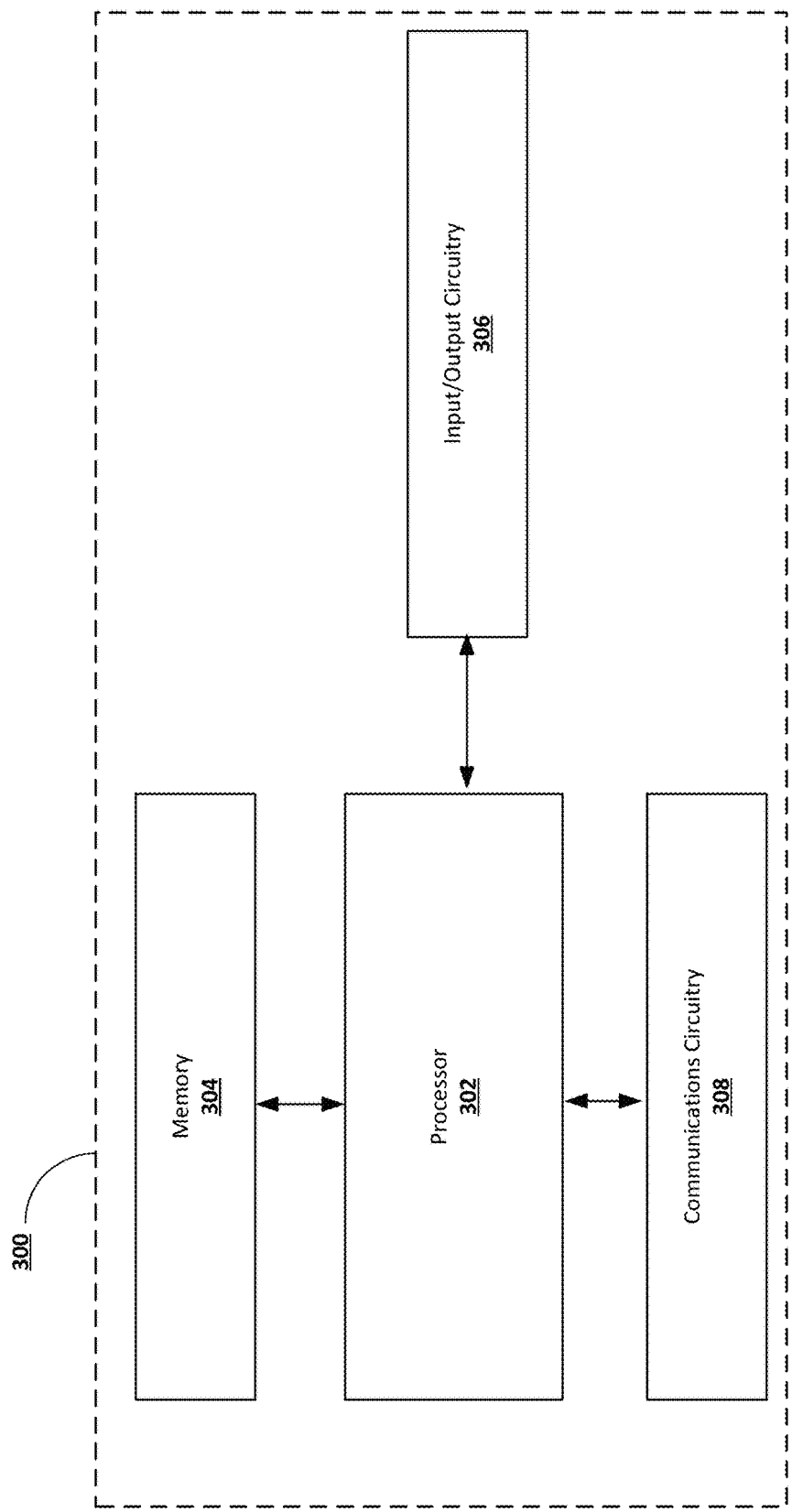
FIG. 3 is a block diagram of an example client computing device structured in accordance with at least some embodiments of the present invention.

Referring now to FIG. 3, a client computing device may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or coprocessor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Data Flows and Operations

Figure 4:
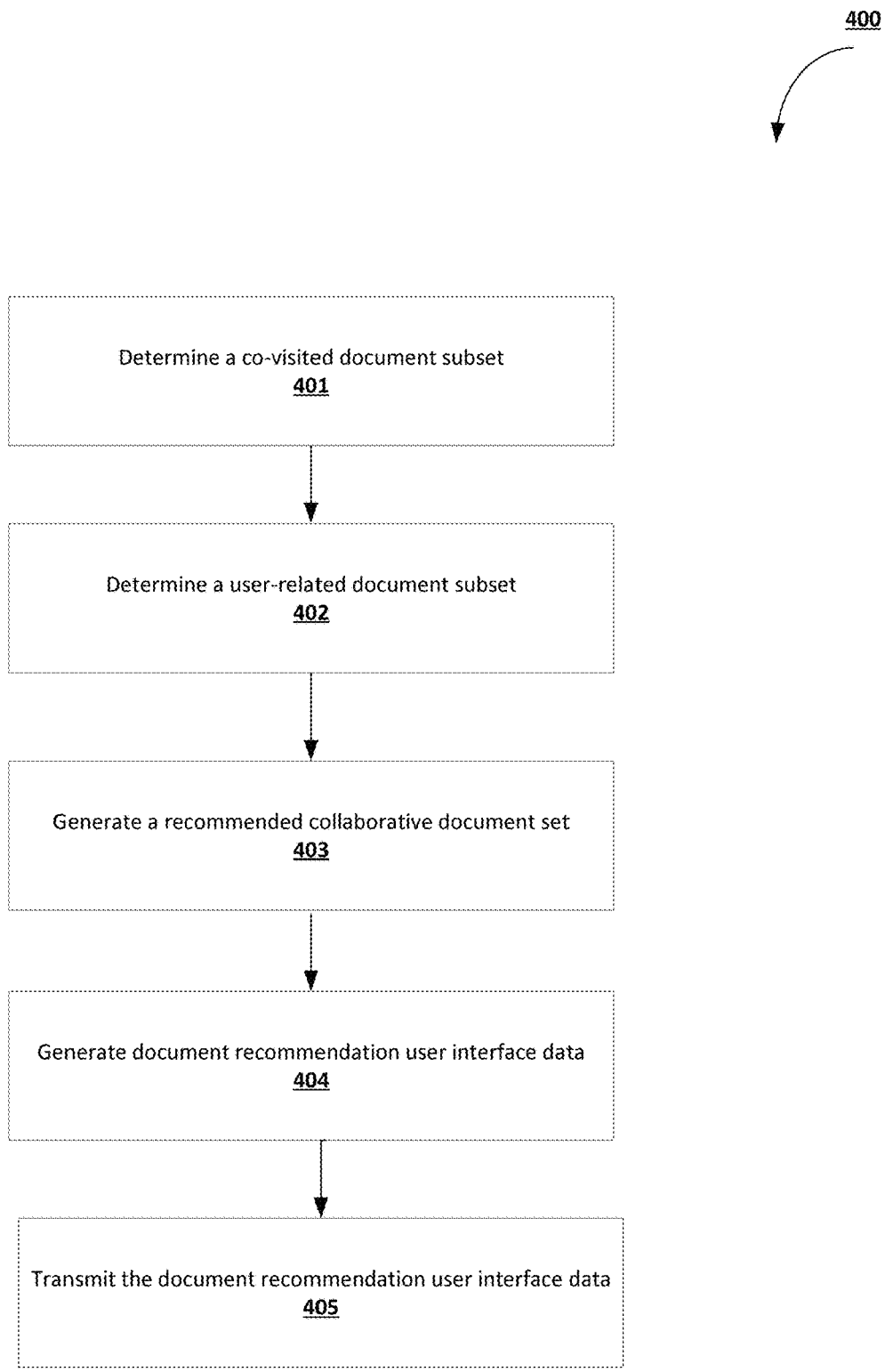
FIG. 4 is a flowchart diagram of an example process for generating a recommended collaborative document subset for a primary collaborative document and a primary user profile in accordance with at least some embodiments of the present invention.

FIG. 4 is a flowchart diagram of an example process 400 for generating a recommended collaborative document set for a primary collaborative document of a collaborative document set in relation to a primary user profile of a user profile set. Via the various operations of the process 500, the document collaboration server computing device 106 can facilitate user interaction with a corpus of documents by generating a recommended collaborative document set that is then transmitted to a client computing device 102, where the client computing device 102 is then configured to generate one or more user interface elements based on the recommended collaborative document set and provide the user interface elements as part of a collaborative document user interface being displayed to an end user of the client computing device 102.

In general, a collaborative document may be a text-based format file (e.g., a Rich Text Format (RTF) file), where the contents of the text-based format file are configured to be editable/accessible by two or more user profiles. The collaborative document is stored in a storage subsystem of a document collaboration server system that comprises the document collaboration server computing device. For example, the document collaboration server system may enable a first user profile to share a collaborative document with one or more other user profiles, where each of the one or more user profiles may be given defined read/write access privileges. An example of a collaborative document is a Confluence® page.

The process 400 begins at operation 401 when the document collaboration server computing device 106 determines, using a cross-document correlation model, a co-visited document subset of the collaborative document set. In some embodiments, each collaborative document in the co-visited document subset is associated with at least one temporally correlated document viewing sequence in the temporally correlated document viewing sequence set that comprises the primary collaborative document. In some embodiments, each co-visited collaborative document in the co-visited document subset has a qualifying relationship with the at least one temporally correlated document viewing sequence in the temporally correlated document viewing sequence set that comprises the co-visited document and the primary collaborative document, and each qualifying relationship for a co-visited collaborative document in the co-visited document subset satisfies one or more user-document relationship sufficiency criteria.

Figure 5:
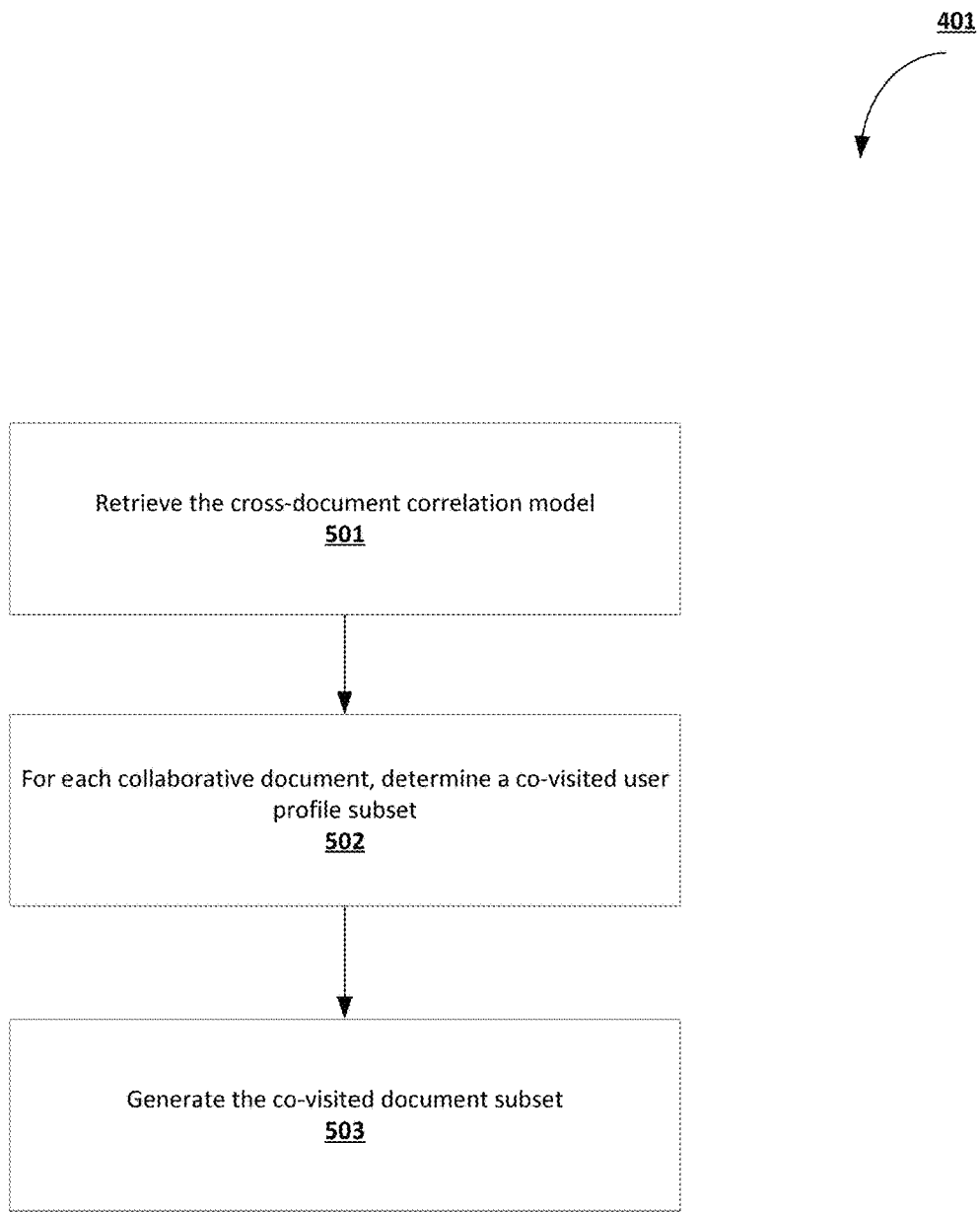
FIG. 5 is a flowchart diagram of an example process for generating a co-visited document subset for a primary collaborative document in accordance with at least some embodiments of the present invention.

In some embodiments, operation 401 may be performed in accordance with the process that is depicted in FIG. 5. The process that is depicted in FIG. 5 begins at operation 501 when the document collaboration server computing device 106 retrieves the cross-document correlation model from the storage subsystem 108 of the document collaboration server system 101 that comprises the document collaboration server computing device 106.

In some embodiments, the cross-document correlation model is generated by the document collaboration server computing device 106 and maintained in the storage subsystem 108 of the document collaboration server system 101 that comprises the document collaboration server computing device 106. The cross-document correlation model is characterized by a temporally correlated document viewing sequence set (i.e., a set of one or more temporally correlated document viewing sequences), where the document collaboration server computing device utilizes the temporally correlated document viewing sequence set to determine a co-visited document subset for a primary collaborative document. For example, given a primary collaborative document, the document collaboration server computing device may be configured to utilize the temporally correlated document viewing sequence set to identify any collaborative documents that are part of a temporally correlated document viewing sequence that comprises the primary collaborative document.

For example, consider the following temporally correlated document viewing sequence sets: $S_1=\{D_1, D_4, D_{10}, D_{11}\}$, $S_2=\{D_{11}, D_1, D_{13}, D_{15}, D_{32}, D_{61}, D_{17}\}$, $S_3=\{D_{21}, D4_{22}, D_{33}, D_{71}\}$, and $S_4=\{D_{45}, D_{41}, D_{51}, D_{33}, D_{54}, D_{66}, D_{68}, D_{69}, D_{131}\}$. Given the primary collaborative document $D_1$, then the co-visited document subset for $D_1$ comprises: $D_4$ (which is part of the temporally correlated document viewing sequence $S_1$ that includes $D_1$), $D_{10}$ (which is part of the temporally correlated document viewing sequence $S_1$ that includes $D_1$), $D_{11}$ (which is part of the temporally correlated document viewing sequences $S_1$ and $S_2$ that both include $D_1$), $D_{13}$ (which is part of the temporally correlated document viewing sequence $S_2$ that includes $D_1$), $D_{15}$ (which is part of the temporally correlated document viewing sequence $S_2$ that includes $D_1$), $D_{17}$ (which is part of the temporally correlated document viewing sequence $S_2$ that includes $D_1$), $D_{32}$ (which is part of the temporally correlated document viewing sequence $S_4$ that includes $D_1$), $D_{32}$ (which is part of the temporally correlated document viewing sequence $S_2$ that includes $D_1$), $D_{33}$ (which is part of the temporally correlated document viewing sequence $S_4$ that includes $D_1$), $D_{54}$ (which is part of the temporally correlated document viewing sequence $S_4$ that includes $D_1$), $D_{61}$ (which is part of the temporally correlated document viewing sequence $S_2$ that includes $D_1$), $D_{66}$ (which is part of the temporally correlated document viewing sequence $S_4$ that includes $D_1$), $D_{68}$ (which is part of the temporally correlated document viewing sequence $S_4$ that includes $D_1$), $D_{69}$ (which is part of the temporally correlated document viewing sequence $S_4$ that includes $D_1$), and $D_{131}$ (which is part of the temporally correlated document viewing sequence $S_4$ that includes $D_1$).

As described above, a cross-document correlation model may be characterized by one or more temporally correlated document viewing sequences. A temporally correlated document viewing sequence may be generated by the document collaboration server computing device 106 based on document viewing data by a client computing device 102 that is associated with a user profile and may be stored in the storage subsystem 108 of the document collaboration server system 101 that comprises the document collaboration server computing device 106 as part of a cross-document correlation model. The temporally correlated document viewing sequence describes a sequence of collaborative documents, where the ordered sequence describes a set of collaborative documents that are viewed by a common user profile during a common document viewing session. For example, a temporally correlated document viewing sequence may describe a set of collaborative documents that are viewed by a common user profile during a defined time window having a defined time window size (e.g., during a defined 24-hour time window). As another example, a temporally correlated document viewing sequence may describe a set of collaborative documents that are viewed by a common user profile during a dynamically inferred time period that begins upon a defined session initiation action by the common user profile (e.g., logging into a document viewing platform associated with the document collaboration server system that comprises the document collaboration server computing device) and terminates upon a defined session termination action by the common user profile (e.g., logging out of a document viewing platform associated with the document collaboration server system that comprises the document collaboration server computing device). In some embodiments, the temporally correlated document viewing sequence describes an ordered sequence of collaborative documents, where the position of each collaborative document in the ordered sequence is determined based on a viewing sequence of the collaborative documents by the common user profile during the common document viewing session.

Each temporally correlated document viewing sequence may be associated with a co-visited user profile. The co-visited user profile for a temporally correlated document viewing sequence may be generated by the document collaboration server computing device 106 based on document viewing data by a client computing device 102 that is associated with a user profile may be stored in the storage subsystem 108 of the document collaboration server system 101 that comprises the document collaboration server computing device 106 as part of a cross-document correlation model. The co-visited user profile for a temporally correlated document viewing sequence describes the common user profile that has viewed the temporally correlated document viewing sequence in a common document viewing session. For example, if the temporally correlated document viewing sequence $S_4=\{D_{45}, D_{41}, D_{51}, D_{33}, D_{54}, D_{66}, D_{68}, D_{69}, D_{131}\}$ describes that the collaborative documents in the sequence $\{D_{45}, D_{41}, D_{51}, D_{33}, D_{54}, D_{66}, D_{68}, D_{69}, D_{131}\}$ are visited by a common user profile $U_4$ during a common document viewing session, then the co-visited user profile for $S_4$ is $U_4$.

At operation 502, the document collaboration server computing device 106 determines, for each collaborative document in the collaborative document set, a co-visited user profile subset based on each co-visited user profile for a temporally correlated document viewing sequence in the document correlation model that includes the collaborative document. In some embodiments, each temporally correlated document viewing sequence in the temporally correlated document viewing sequence set is associated with a co-visited user profile of the user profile set, and each collaborative document in the collaborative document set is associated with a co-visited user profile subset of the user profile set that comprises any co-visited user profiles for any temporally correlated document viewing sequences that comprise the collaborative document.

The co-visiting user profile subset for a collaborative document may be generated by the document collaboration server computing device 106 based on a cross-document correlation model maintained in the storage subsystem 108 of the document collaboration server system 101 that comprises the document collaboration server computing device 106. The co-visited user profile subset may describe each co-visited user profile for a temporally correlated document viewing sequence in the cross-document collaboration model that includes the collaborative document that is associated with the co-visited user profile. In this way, the co-visited user profile subset describes all user profiles that have visited/accessed the corresponding collaborative document during at least one document viewing session. For example, given a cross-document correlation model characterized by the temporally correlated document viewing sequence sets $S_1=\{D_1, D_4, D_{10}, D_{11}\}$, $S_2=\{D_{11}, D_1, D_{13}, D_{15}, D_{32}, D_{61}, D_{17}\}$, $S_3=\{D_{21}, D4_{22}, D_{33}, D_{71}\}$, and $S_4=\{D_{45}, D_{41}, D_{51}, D_{33}, D_{54}, D_{66}, D_{68}, D_{69}, D_{131}\}$, and further given that the co-visited user profile for $S_1$ is $U_1$, the co-visited user profile for $S_2$ is $U_2$, the co-visited user profile for $S_3$ is $U_3$, and the co-visited user profile for $S_4$ is $U_4$, then (for example) the co-visited user profile subset for $D_4$ includes only $U_1$ (since $D_4$ is only in $S_1$ that is associated with $U_1$), the co-visited use profile subset for $D_{11}$ is $U_1$ and $U_2$ (since $D_{11}$ is both in $S_1$ that is associated with $U_1$ and in $S_2$ that is associated with $U_2$), and the co-visited user profile subset for $D_1$ is $U_1$, $U_2$, and $U_4$ (since $D_1$ is in all of $S_1$ that is associated with $U_1$, $S_2$ that is associated with $U_2$, and $S_4$ that is associated with $U_4$).

At operation 503, the document collaboration server computing device 106 generates the co-visited document subset based on the cross-document correlation model. In some embodiments, given the cross-document correlation model that is associated with the temporally correlated document viewing set, each collaborative document in the co-visited document subset is associated with at least one temporally correlated document viewing sequence in the temporally correlated document viewing sequence set that comprises the primary collaborative document. The co-visited subset may be generated by the document collaboration server computing device 106 and used by the document collaboration server computing device 106 to generate a recommended collaborative document set, where the recommended collaborative document set is configured to be transmitted to a client computing device and used by the client computing device to generate one or more user interface elements based on the recommended collaborative document set and provide the user interface elements as part of a user interface being displayed to an end user of the client computing device.

The co-visited document subset may comprise each collaborative document that is in a temporally correlated document viewing sequence that also comprises a primary collaborative document associated with the co-visited document subset. For example, as described above, given the following temporally correlated document viewing sequence sets: $S_1=\{D_1, D_4, D_{10}, D_{11}\}$, $S_2=\{D_{11}, D_1, D_{13}, D_{15}, D_{32}, D_{61}, D_{17}\}$, $S_3=\{D_{21}, D4_{22}, D_{33}, D_{71}\}$, and $S_4=\{D_{45}, D_{41}, D_{51}, D_{33}, D_{54}, D_{66}, D_{68}, D_{69}, D_{131}\}$, and given the primary collaborative document $D_1$, then the co-visited document subset for $D_1$ comprises: $D_4$ (which is part of the temporally correlated document viewing sequence $S_1$ that includes $D_1$), $D_{10}$ (which is part of the temporally correlated document viewing sequence $S_1$ that includes $D_1$), $D_{11}$ (which is part of the temporally correlated document viewing sequences $S_1$ and $S_2$ that both include $D_1$), $D_{13}$ (which is part of the temporally correlated document viewing sequence $S_2$ that includes $D_1$), $D_{15}$ (which is part of the temporally correlated document viewing sequence $S_2$ that includes $D_1$), $D_{17}$ (which is part of the temporally correlated document viewing sequence $S_2$ that includes $D_1$), $D_{32}$ (which is part of the temporally correlated document viewing sequence $S_4$ that includes $D_1$), $D_{32}$ (which is part of the temporally correlated document viewing sequence $S_2$ that includes $D_1$), $D_{33}$ (which is part of the temporally correlated document viewing sequence $S_4$ that includes $D_1$), $D_{54}$ (which is part of the temporally correlated document viewing sequence $S_4$ that includes $D_1$), $D_{61}$ (which is part of the temporally correlated document viewing sequence $S_2$ that includes $D_1$), $D_{66}$ (which is part of the temporally correlated document viewing sequence $S_4$ that includes $D_1$), $D_{68}$ (which is part of the temporally correlated document viewing sequence $S_4$ that includes $D_1$), $D_{69}$ (which is part of the temporally correlated document viewing sequence $S_4$ that includes $D_1$), and $D_{131}$ (which is part of the temporally correlated document viewing sequence $S_4$ that includes $D_1$).

Returning to FIG. 4, at operation 402, the document collaboration server computing device 106 determines, using a cross-user correlation model, a user-related document subset of the co-visited document subset. In some embodiments, the cross-user correlation model is characterized by a qualifying user relationship set. In some embodiments, each co-visited user profile subset for the user-related document subset comprises at least one qualifying co-visited user profile that has a qualifying relationship with the primary user profile in accordance with the user qualifying relationship set. In some embodiments, the recommended collaborative document set is determined based on a selected subset of the user-related document set, and the selected subset is determined based on one or more user-document relationship sufficiency criteria.

In some embodiments, the qualifying user relationship set comprises one or more user pair-wise interaction relationships, and each pair-wise interaction relationship describes that: (i) a first user profile associated with the pair-wise interaction relationship has performed a first qualifying document collaboration action with respect to a second collaborative document associated with a second user profile that is associated with the pair-wise interaction relationship, and (ii) the second user profile qualifying document collaboration action has performed a second qualifying document collaboration action with respect to a first collaborative document associated with the first user profile.

Figure 6:
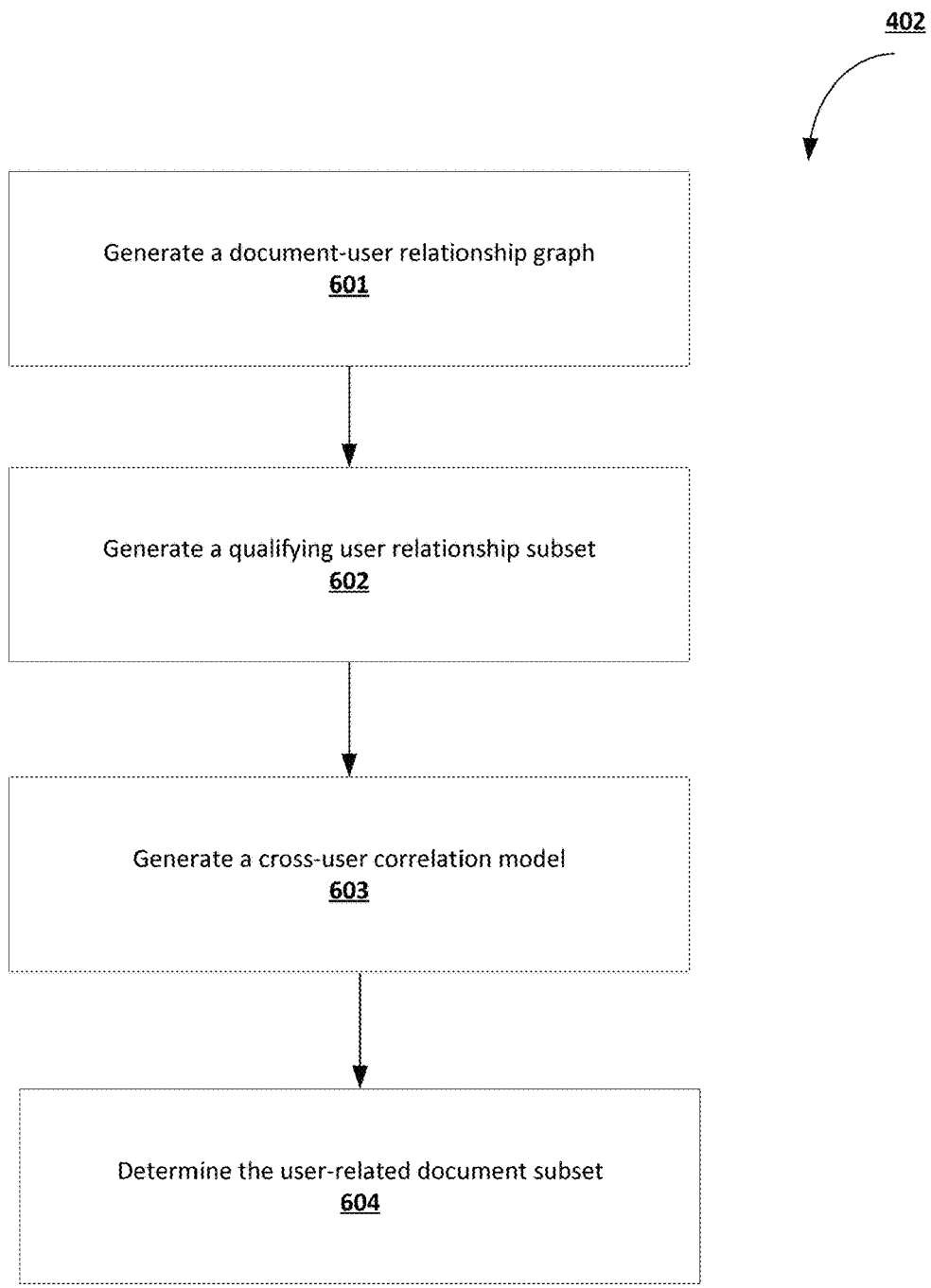
FIG. 6 is a flowchart diagram of an example process for generating a user-related document subset for a primary collaborative document and a primary user profile in accordance with at least some embodiments of the present invention.

In some embodiments, operation 402 may be performed in accordance with the process that is depicted in FIG. 6. The process that is depicted in FIG. 6 begins at operation 601 when the document collaboration server computing device 106 generates a document-user relationship graph for a user profile set and a collaborative document set. In some embodiments, the document-user relationship graph describes relationships across collaborative documents, relationships across user profiles, as well as relationships between collaborative documents and user profiles.

Figure 7:
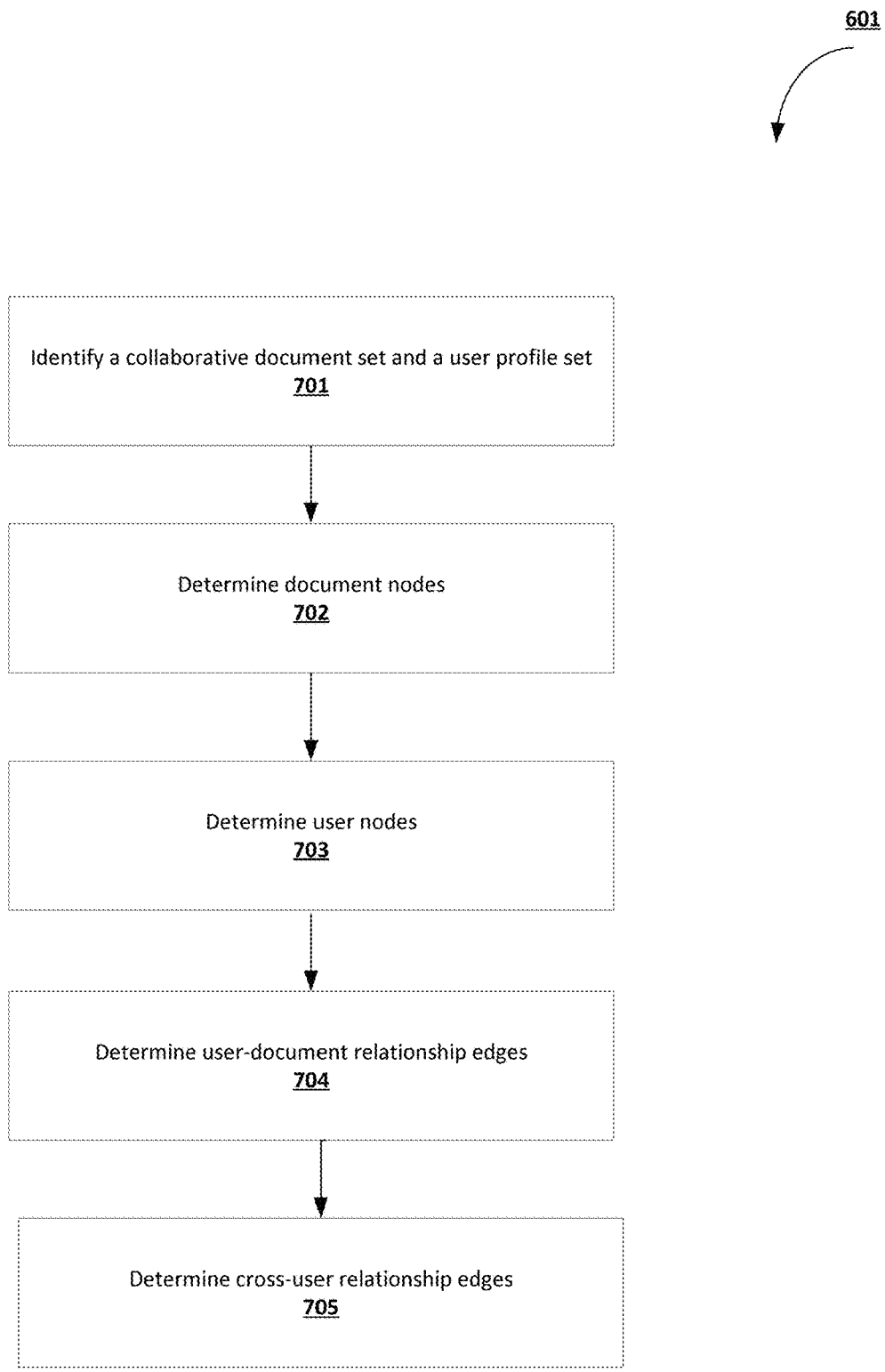
FIG. 7 is a flowchart diagram of an example process for generating a user-document relationship graph in accordance with at least some embodiments of the present invention.

In some embodiments, operation 601 may be performed in accordance with the process that is depicted in FIG. 7. The process that is depicted in FIG. 7 begins at operation 701 when the document collaboration server computing device 106 identifies the user profile set and the collaborative document set. In some embodiments, to identify the user profile set and the collaborative document set, the document collaboration server computing device 106 retrieves the user identifiers and the page identifiers associated with a collaborative document space, such as the user identifiers and the page identifiers associated with a collaborative document space for a company. In some embodiments, operation 701 may be performed in accordance with the code segment 800 of FIG. 8 that may be supplied to an application programming interface of the Neo4J graph database management system. In some embodiments, in the code segment 800 of FIG. 8, users belonging to a common instance associated with a common tenant identifier are aggregated into a common, larger graph.

At operation 702, the document collaboration server computing device 106 generates document nodes for the user-relationship graph based on the collaborative document set. In some embodiments, to generate the document nodes, the document collaboration server computing device 106 performs a merge operation across the page identifiers associated with a collaborative document space, such as the user identifiers and the page identifiers associated with a collaborative document space for a company. In some embodiments, operation 702 may be performed in accordance with the code segment 900 of FIG. 9 that may be supplied to an application programming interface of the Neo4J graph database management system. In some embodiments, in the code segment 900 of FIG. 9, a page identifier comprising a tenant identifier is generated for each page, and then merging is performed on the basis of the generated page identifier.

At operation 703, the document collaboration server computing device 106 generates user nodes for the user-relationship graph based on the user profile set. In some embodiments, to generate the user nodes, the document collaboration server computing device 106 performs a merge operation across the user identifiers associated with a collaborative document space, such as the user identifiers and the page identifiers associated with a collaborative document space for a company. In some embodiments, operation 703 may be performed in accordance with the code segment 1000 of FIG. 10 that may be supplied to an application programming interface of the Neo4J graph database management system. In some embodiments, in the code segment 1000 of FIG. 10, a merge operation is performed based on user identifiers, so that users are linked to pages and all nodes are de-duped.

At operation 704, the document collaboration server computing device 106 generates user-document relationships edges for the user-relationship graph based on detected instances when user profiles have visited/accessed collaborative documents. In some embodiments, to generate the user-document relationships, the document collaboration server computing device 106 performs successive match operations based on page identifiers and user identifiers associated with a collaborative document space, such as the user identifiers and the page identifiers associated with a collaborative document space for a company. In some embodiments, operation 704 may be performed in accordance with the code segment 1100 of FIG. 11 that may be supplied to an application programming interface of the Neo4J graph database management system. In some embodiments, in the code segment 1100 of FIG. 11, a user-page graph is generated based on the user-page links and then user viewership relationships are loaded.

At operation 705, the document collaboration server computing device 106 generates cross-user relationships edges (i.e., user-user relationship edges) for the user-relationship graph based on detected instances when user profiles have viewed/access common collaborative documents. In some embodiments, to generate cross-user relationships, the document collaboration server computing device 106 performs matching operations across collaborative documents based on each set of user-document relationships edges for a collaborative document. In some embodiments, operation 705 may be performed in accordance with the code segment 1200 of FIG. 12 that may be supplied to an application programming interface of the Neo4J graph database management system. In some embodiments, in the code segment 1200 of FIG. 12, the document collaboration server computing device 106 determines commonly viewed pages based on the user-page graph.

An operational example of a user-document relationship graph 1300 is depicted in FIG. 13. As depicted in FIG. 13, the user-document relationship graph depicts: (i) user-document relationships edges such as the user-document relationships edge 1301 between the user profile $U_1$ and the collaborative document $D_1$ or the user-document relationships edge 1302 between the user profile $U_2$ and the collaborative document $D_1$, and (ii) cross-user relationship edges such as the cross-user relationship edge 1303 between $U_1$ and $U_2$ that indicates that the two user profiles have accessed the common collaborative document $D_1$.

Returning to FIG. 6, at operation 602, the document collaboration server computing device 106 generates the qualifying user relationship set based on the user-document relationship graph. The qualifying relationship set may be generated by the document collaboration server computing device 106 and maintained in the storage subsystem 108 of the document collaboration server system 101 that comprises the document collaboration server computing device 106 as part of a cross-document user correlation model.

The qualifying user relationship may describe that two or more user profiles associated with the qualifying user relationship have a user relationship between them that satisfies one or more defined user relationship sufficiency criteria, where the defined user relationship sufficiency criteria may include one or more criteria defined based on whether the two or more user profiles have performed common document collaboration actions with respect to collaborative documents associated with the two or more user profile.

For example, in some embodiments, if user profile $U_1$ has commented on a collaborative document associated with the user profile $U_2$ and the user profile $U_2$ has commented on a collaborative document associated with the user profile $U_1$, then the two user profile $U_1$ and $U_2$ are deemed to be associated with a common qualifying user relationship.

As another example, in some embodiments, if user profile $U_1$ has shared a collaborative document associated with the user profile $U_2$ and the user profile $U_2$ has shared a collaborative document associated with the user profile $U_1$, then the two user profile $U_1$ and $U_2$ are deemed to be associated with a common qualifying user relationship.

As yet another example, in some embodiments, if user profile $U_1$ has performed at least one qualifying document collaboration action (e.g., commenting, sharing, liking, and/or the like) with respect to a collaborative document associated with the user profile $U_2$ and the user profile $U_2$ has also performed at least one qualifying document collaboration action (e.g., commenting, sharing, liking, and/or the like) with respect to a collaborative document associated with the user profile $U_1$, then the two user profile $U_1$ and $U_2$ are deemed to be associated with a common qualifying user relationship.

As a further example, in some embodiments, if user profile $U_1$ has performed at least n qualifying document collaboration actions (e.g., commenting, sharing, liking, and/or the like) with respect to a collaborative document associated with the user profile $U_2$ and the user profile $U_2$ has also performed at least n qualifying document collaboration actions (e.g., commenting, sharing, liking, and/or the like) with respect to a collaborative document associated with the user profile $U_1$, then the two user profile $U_1$ and $U_2$ are deemed to be associated with a common qualifying user relationship.

In some embodiments, the defined user relationship sufficiency criteria may include one or more criteria defined based on whether the two or more user profiles have performed common document collaboration actions with respect to a document collaborative document. In some embodiments, the defined user relationship sufficiency criteria may include one or more criteria defined based on whether the two or more user profiles have performed at least one document collaboration action with respect to a document collaborative document. In some embodiments, the defined user relationship sufficiency criteria may include one or more criteria defined based on whether the two or more user profiles have performed at least n document collaboration actions with respect to a document collaborative document.

At operation 603, the document collaboration server computing device 106 generates the cross-user correlation model based on the qualifying user relationship set. The cross-user relationship graph may be generated by the document collaboration server computing device 106 and maintained in the storage subsystem 108 of the document collaboration server system 101 that comprises the document collaboration server computing device 106.

The cross-user correlation model may be characterized by a qualifying user relationship set (i.e., a set of one or more qualifying user relationships), where the document collaboration server computing device utilizes the temporally correlated document viewing sequence set to determine a user-related document subset for a primary collaborative document. For example, the document collaboration server computing device may determine that each collaborative document in a defined collaborative document set (e.g., in a co-visited document subset for a given primary collaborative document) whose corresponding co-visited user profile subset has at least one qualifying co-visited user profile that has a qualifying user relationship with a given primary user profile, as determined in accordance with the user qualifying relationship set. For example, given a defined collaborative document set that includes a collaborative document $D_2$ that is associated with a user profile $U_2$, a collaborative document $D_3$ that is associated with a user profile $U_3$, and a collaborative document $D_4$ that is associated with a user profile $U_4$, and given a primary user profile $U_1$, if the qualifying user relationship set describes that $U_1$ has a qualifying user relationship with $U_2$ and $U_4$ but not with $U_3$, then the user-related document subset associated with $U_1$ includes $D_2$ and $D_4$ but not $D_3$.

At operation 604, the document collaboration server computing device 106 determines the user-related document subset based on the cross-user relationship graph. The user-related document subset may be generated by the document collaboration server computing device and used by the document collaboration server computing device to generate a recommended collaborative document set, where the recommended collaborative document set is configured to be transmitted to a client computing device and used by the client computing device to generate one or more user interface elements based on the recommended collaborative document set and provide the user interface elements as part of a user interface being displayed to an end user of the client computing device.

The user-related document subset for a given user profile may include each collaborative document in a co-visited document subset for a given primary collaborative document) whose corresponding co-visited user profile subset has at least one qualifying co-visited user profile that has a qualifying relationship with the given primary user profile in accordance with the user qualifying relationship set is the user-related document subset for the primary collaborative document. For example, as described above, given a visited document subset that includes a collaborative document $D_2$ that is associated with a user profile $U_2$, a collaborative document $D_3$ that is associated with a user profile $U_3$, and a collaborative document $D_4$ that is associated with a user profile $U_4$, and given a primary user profile $U_1$, if the qualifying user relationship set describes that $U_1$ has a qualifying user relationship with $U_2$ and $U_4$ but not with $U_3$, then the user-related document subset associated with $U_1$ includes $D_2$ and $D_4$ but not $D_3$. In some embodiments, the qualifying user profile describes a user profile that is deemed to have at least one qualifying relationship with a primary user profile based on a qualifying user relationship set defined by a cross-user correlation model. For example, if the qualifying user relationship set describes that the primary user profile $U_1$ has a qualifying user relationship with the user profile $U_2$ and the user profile $U_4$ but not with the user profile $U_3$, then $U_2$ and $U_4$ are qualifying user profiles, while $U_3$ is not.

Returning to FIG. 4, at operation 403, the document collaboration server computing device 106 (e.g., optionally) generates the recommended collaborative document set based on a selected subset of the user-related document set, wherein each collaborative document in the selected subset has a user-document relationship with the at least one qualifying co-visited user profile for the for the collaborative document that satisfies one or more user-document relationship sufficiency criteria. Examples of defined user-document relationship sufficiency criteria include a of defined user-document relationship sufficiency criterion that evaluates whether a user profile has either stayed on a collaborative document user interface associated with the a collaborative document for at least a threshold time period (e.g., for at least forty seconds), or commented on the collaborative document, or starred a collaborative document, or shared a collaborative document, or edited a collaborative document. Other examples of defined user-document relationship sufficiency criteria include a of defined user-document relationship sufficiency criterion that evaluates whether at least n of the following conditions are successfully satisfied: a user profile has either stayed on a collaborative document user interface associated with the a collaborative document for at least a threshold time period (e.g., for at least forty seconds), or commented on the collaborative document, or starred a collaborative document, or shared a collaborative document, or edited a collaborative document.

A user-document relationship may describe one or more features associated with a documented/recorded interaction of a corresponding user profile with a corresponding collaborative document. For example, the user-document relationship may describe at least one of: (i) how long the corresponding user profile stayed on a collaborative document user interface associated with the corresponding collaborative document during the documented/recorded interaction, and (ii) during the documented/recorded interaction, which one or more of a defined set of document collaboration operations (e.g., editing, commenting, staring starring, liking, watching, sharing, and/or the like) the corresponding user profile performed in relation to the corresponding collaborative document. In some embodiments, the document collaboration server computing device determines whether a user-document relationship associated with a corresponding user profile and a corresponding collaborative document satisfies one or more defined user-document relationship sufficiency criteria. In some embodiments, the document collaboration server computing device utilizes the noted determination to generate a recommended collaborative document set, where the recommended collaborative document set is configured to be transmitted to a client computing device and used by the client computing device to generate one or more user interface elements based on the recommended collaborative document set and provide the user interface elements as part of a user interface being displayed to an end user of the client computing device.

In some embodiments, the one or more user-document relationship sufficiency criteria comprise a user-document relationship sufficiency criterion defined based at least in part on each viewing time feature for a user-document relationship. In some embodiments, the one or more user-document relationship sufficiency criteria comprise a user-document relationship sufficiency criterion defined based at least in part on each sharing indication feature for a user-document relationship. In some embodiments, the one or more user-document relationship sufficiency criteria comprise a user-document relationship sufficiency criterion defined based at least in part on each commenting indication feature for a user-document relationship. In some embodiments, the one or more user-document relationship sufficiency criteria comprise a user-document relationship sufficiency criterion defined based at least in part on each starring indication feature for a user-document relationship. In some embodiments, the one or more user-document relationship sufficiency criteria comprise a user-document relationship sufficiency criterion defined based at least in part on each watching indication feature for a user-document relationship.

At operation 404, the document collaboration server computing device 106 generates document recommendation user interface data for a document recommendation user interface element that describes each collaborative document in the recommended collaborative document set. An operational example of a document recommendation user interface element 1401 is depicted in the collaborative document user interface 1400 of FIG. 14, which describes and includes links to three collaborative documents in a recommended collaborative document set.

At operation 405, the document collaboration server computing device 106 transmits the document recommendation user interface data to a client computing device 102. In some embodiments, the client computing device 102 is configured to generate a document recommendation user interface element based on the document recommendation user interface data and display the document recommendation user interface element to an end user of the client computing device as part of a collaborative document user interface for the primary collaborative document.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language page), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending pages to and receiving pages from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for generating a recommended collaborative document set for a primary collaborative document of a collaborative document set in relation to a primary user profile of a user profile set, the apparatus comprising a display, at least one processor, and at least one memory including program code, the at least one memory and the program code configured to, with the at least one processor, cause the apparatus to at least:

determine, using a cross-document correlation model, a co-visited document subset of the collaborative document set, wherein: (i) the cross-document correlation model is characterized by a temporally correlated document viewing sequence set, (ii) each temporally correlated document viewing sequence in the temporally correlated document viewing sequence set is associated with a co-visited user profile of the user profile set, (iii) each collaborative document in the collaborative document set is associated with a co-visited user profile subset of the user profile set that comprises any co-visited user profiles for any temporally correlated document viewing sequences that comprise the collaborative document, and (iv) each co-visited document in the co-visited document subset is associated with at least one temporally correlated document viewing sequence in the temporally correlated document viewing sequence set that comprises the co-visited document and the primary collaborative document;

determine, using a cross-user correlation model, a user-related document subset of the co-visited document subset, wherein: (i) the cross-user correlation model is characterized by a qualifying user relationship set, (ii) each co-visited user profile subset for the user-related document subset comprises at least one qualifying co-visited user profile that has a qualifying relationship with the primary user profile in accordance with the qualifying user relationship set, and (iii) the qualifying user relationship set comprises one or more user pair-wise interaction relationships, wherein each pair-wise interaction relationship describes that: (i) a first user profile associated with the pair-wise interaction relationship has performed a first qualifying document collaboration action with respect to a second collaborative document associated with a second user profile that is associated with the pair-wise interaction relationship, and (ii) the second user profile associated with the pair-wise interaction relationship has performed a second qualifying document collaboration action with respect to a first collaborative document associated with the first user profile, wherein the first qualifying document collaboration action or the second qualifying document collaboration action is at least one of an accessing, commenting, sharing, starring, editing, or liking document collaboration action; and generate the recommended collaborative document set based on the user-related document subset.

2. The apparatus of claim 1, wherein:

the recommended collaborative document set is determined based on a selected subset of the user-related document subset, and each collaborative document in the selected subset has a user-document relationship with the at least one qualifying co-visited user profile for the collaborative document that satisfies one or more user-document relationship sufficiency criteria.

3. The apparatus of claim 1, wherein:

each co-visited document in the co-visited document subset has a qualifying relationship with the at least one temporally correlated document viewing sequence in the temporally correlated document viewing sequence set that comprises the co-visited document and the primary collaborative document, and each qualifying relationship for a co-visited collaborative document in the co-visited document subset satisfies one or more user-document relationship sufficiency criteria.

4. The apparatus of claim 3, wherein the one or more user-document relationship sufficiency criteria comprise a user-document relationship sufficiency criterion defined based at least in part on each viewing time feature for a user-document relationship.

5. The apparatus of claim 3, wherein the one or more user-document relationship sufficiency criteria comprise a user-document relationship sufficiency criterion defined based at least in part on each sharing indication feature for a user-document relationship.

6. The apparatus of claim 3, wherein the one or more user-document relationship sufficiency criteria comprise a user-document relationship sufficiency criterion defined based at least in part on each commenting indication feature for a user-document relationship.

7. The apparatus of claim 3, wherein the one or more user-document relationship sufficiency criteria comprise a user-document relationship sufficiency criterion defined based at least in part on each starring indication feature for a user-document relationship.

8. The apparatus of claim 3, wherein the one or more user-document relationship sufficiency criteria comprise a user-document relationship sufficiency criterion defined based at least in part on a watching indication feature for a user-document relationship.

9. A computer-implemented method for generating a recommended collaborative document set for a primary collaborative document of a collaborative document set in relation to a primary user profile of a user profile set, the computer-implemented method comprising:
  determining, using a cross-document correlation model, a co-visited document subset of the collaborative document set, wherein: (i) the cross-document correlation model is characterized by a temporally correlated document viewing sequence set, (ii) each temporally correlated document viewing sequence in the temporally correlated document viewing sequence set is associated with a co-visited user profile of the user profile set, (iii) each collaborative document in the collaborative document set is associated with a co-visited user profile subset of the user profile set that comprises any co-visited user profiles for any temporally correlated document viewing sequences that comprise the collaborative document, and (iv) each co-visited document in the co-visited document subset is associated with at least one temporally correlated document viewing sequence in the temporally correlated document viewing sequence set that comprises the primary collaborative document;
  determining, using a cross-user correlation model, a user-related document subset of the co-visited document subset, wherein: (i) the cross-user correlation model is characterized by a qualifying user relationship set, (ii) each co-visited user profile subset for the user-related document subset comprises at least one qualifying co-visited user profile that has a qualifying relationship with the primary user profile in accordance with the qualifying user relationship set, and (iii) the qualifying user relationship set comprises one or more user pair-wise interaction relationships,
    wherein each pair-wise interaction relationship describes that: (i) a first user profile associated with the pair-wise interaction relationship has performed a first qualifying document collaboration action with respect to a second collaborative document associated with a second user profile that is associated with the pair-wise interaction relationship, and (ii) the second user profile associated with the pair-wise interaction relationship has performed a second qualifying document collaboration action with respect to a first collaborative document associated with the first user profile,
    wherein the first qualifying document collaboration action or the second qualifying document collaboration action is at least one of an accessing, commenting, sharing, starring, editing, or liking document collaboration action; and
  generating the recommended collaborative document set based on the user-related document subset.

10. The computer-implemented method of claim 9, wherein:
  each co-visited document in the co-visited document subset has a qualifying relationship with the at least one temporally correlated document viewing sequence in the temporally correlated document viewing sequence set that comprises the co-visited document and the primary collaborative document, and
  each qualifying relationship for a co-visited document in the co-visited document subset satisfies one or more user-document relationship sufficiency criteria.

11. The computer-implemented method of claim 10, wherein the one or more user-document relationship sufficiency criteria comprise a user-document relationship sufficiency criterion defined based at least in part on each viewing time feature for a user-document relationship.

12. The computer-implemented method of claim 10, wherein the one or more user-document relationship sufficiency criteria comprise a user-document relationship sufficiency criterion defined based at least in part on each sharing indication feature for a user-document relationship.

13. The computer-implemented method of claim 10, wherein the one or more user-document relationship sufficiency criteria comprise a user-document relationship sufficiency criterion defined based at least in part on each commenting indication feature for a user-document relationship.

14. A non-transitory computer storage medium for generating a recommended collaborative document set for a primary collaborative document of a collaborative document set in relation to a primary user profile of a user profile set, the non-transitory computer storage medium comprising instructions for generating a protocol recommendation for an application data object, the instructions being configured to cause one or more processors to at least perform operations configured to:
  determine, using a cross-document correlation model, a co-visited document subset of the collaborative document set, wherein: (i) the cross-document correlation model is characterized by a temporally correlated document viewing sequence set, (ii) each temporally correlated document viewing sequence in the temporally correlated document viewing sequence set is associated with a co-visited user profile of the user profile set, (iii) each collaborative document in the collaborative document set is associated with a co-visited user profile subset of the user profile set that comprises any co-visited user profiles for any temporally correlated document viewing sequences that comprise the collaborative document, and (iv) each co-visited document in the co-visited document subset is associated with at least one temporally correlated document viewing sequence in the temporally correlated document viewing sequence set that comprises the primary collaborative document;
  determine, using a cross-user correlation model, a user-related document subset of the co-visited document subset, wherein: (i) the cross-user correlation model is characterized by a qualifying user relationship set, (ii) each co-visited user profile subset for the user-related document subset comprises at least one qualifying co-visited user profile that has a qualifying relationship with the primary user profile in accordance with the qualifying user relationship set, and (iii) the qualifying user relationship set comprises one or more user pair-wise interaction relationships, wherein each pair-wise interaction relationship describes that: (i) a first user profile associated with the pair-wise interaction relationship has performed a first qualifying document collaboration action with respect to a second collaborative document associated with a second user profile that is associated with the pair-wise interaction relationship, and (ii) the second user profile associated with the pair-wise interaction relationship has performed a second qualifying document collaboration action with respect to a first collaborative document associated with the first user profile, wherein the first qualifying document collaboration action or the second qualifying document collaboration action is at least one of an accessing, commenting, sharing, starring, editing, or liking document collaboration action; and generate the recommended collaborative document set based on the user-related document subset.

* * * * *